United States Patent [19]
Feng

[11] Patent Number: 6,062,475
[45] Date of Patent: May 16, 2000

[54] PORTABLE DATA COLLECTION DEVICE INCLUDING COLOR IMAGING DATAFORM READER ASSEMBLY

[75] Inventor: Chen Feng, Bothell, Wash.

[73] Assignee: Metanetics Corporation, Bothell, Wash.

[21] Appl. No.: 08/882,025

[22] Filed: Jun. 25, 1997

[51] Int. Cl.$^7$ ...................................................... G06K 7/10
[52] U.S. Cl. ................................ 235/462.06; 235/462.01
[58] Field of Search .............................. 235/462.06, 469,
235/462.04; 348/272, 273, 274, 275, 276,
277, 278, 279, 280, 281, 282; 382/167,
163, 162, 274, 275

[56] References Cited

U.S. PATENT DOCUMENTS

| | | | |
|---|---|---|---|
| 4,951,130 | 8/1990 | Iizuki et al. | 358/44 |
| 5,177,346 | 1/1993 | Chisholm | 235/462 |
| 5,309,243 | 5/1994 | Tsai | 348/221 |
| 5,576,527 | 11/1996 | Sawanobori | 235/455 |
| 5,703,641 | 12/1997 | Watanabe | 348/274 |
| 5,714,745 | 2/1998 | Je et al. | 235/469 |
| 5,717,195 | 2/1998 | Feng et al. | 235/470 |
| 5,734,759 | 3/1998 | Hirota et al. | 382/274 |
| 5,783,811 | 7/1998 | Feng et al. | 235/462 |
| 5,793,033 | 8/1998 | Feng et al. | 235/472 |
| 5,834,754 | 11/1998 | Feng et al. | 235/472 |
| 5,835,614 | 11/1998 | Aoyama et al. | 382/104 |
| 5,844,565 | 12/1998 | Mizutani et al. | 345/429 |

OTHER PUBLICATIONS

Title: *Metanetics Corporation IR–2000 Hand Held Image Reader User's Guide*. To the best of Applicant's knowledge, this publication was published more than one year prior to the filing date of the above–named patent application.

*Primary Examiner*—Thien M. Le
*Assistant Examiner*—Daniel H. Sherr
*Attorney, Agent, or Firm*—Watts, Hoffmann, Fisher & Heinke, Co., L.P.A.

[57] ABSTRACT

A portable data collection device providing for dataform decoding and color imaging. An imaging assembly is provided that includes a board camera having black and white circuitry and generates a composite video signal representing an image of a target area of the imaging assembly when actuated. The imaging assembly includes a two dimensional photosensor array overlaid by a color filter having a repeating pattern of four color filter elements. The imaging assembly is selectively actuatable with a first trigger for reading a target dataform in the imaging assembly's target area and actuatable with a second trigger for capturing a image of the target object in the target area. When the device is operated in the dataform reading mode, compensation circuitry is actuated to operate on digital gray scale values extracted from the composite video signal to adjust gray scale value magnitudes to compensate for the transmittivity differences of the color filter elements to improve decodability of the imaged dataform. When the device is operated in the imaging mode, conversion circuitry is actuated to convert the gray scale values to either Y-C or RGB digital data and a D/A converter further processes the Y-C or RGB digital data to provide an analog Y-C or RGB output signal.

21 Claims, 16 Drawing Sheets

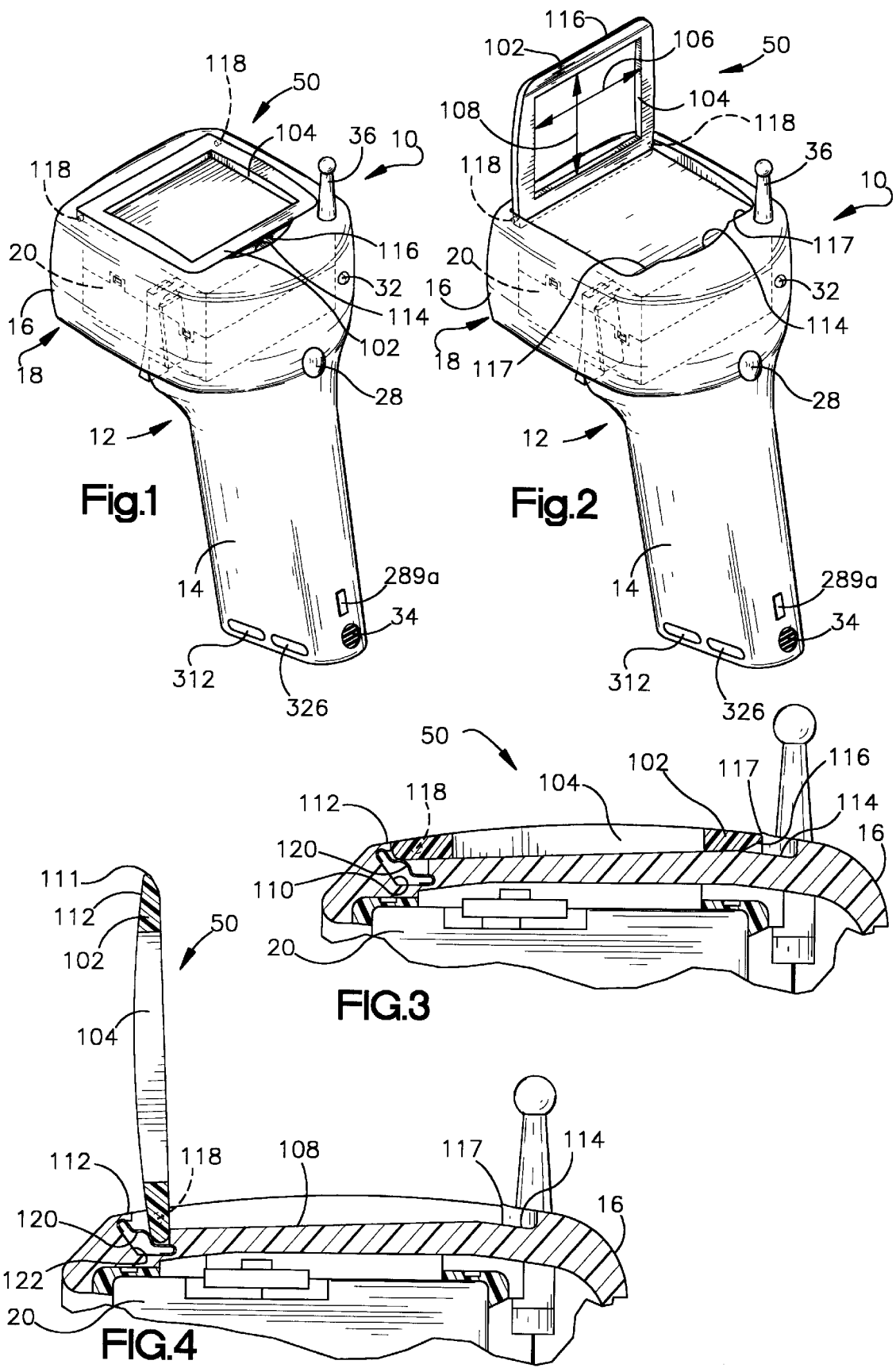

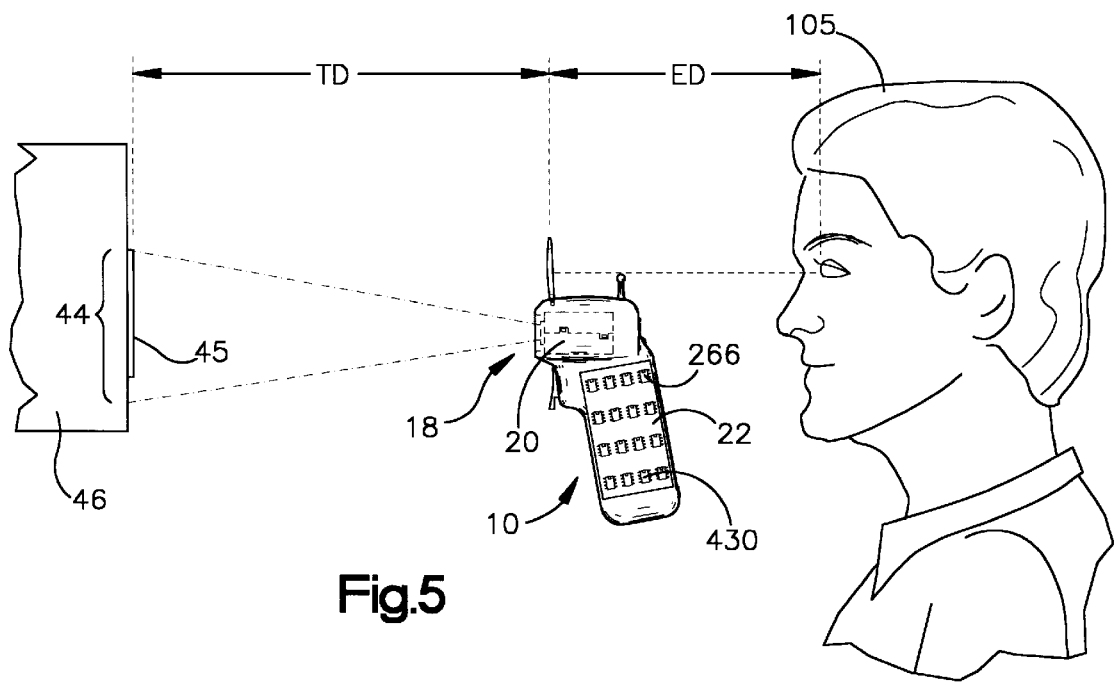
Fig.5
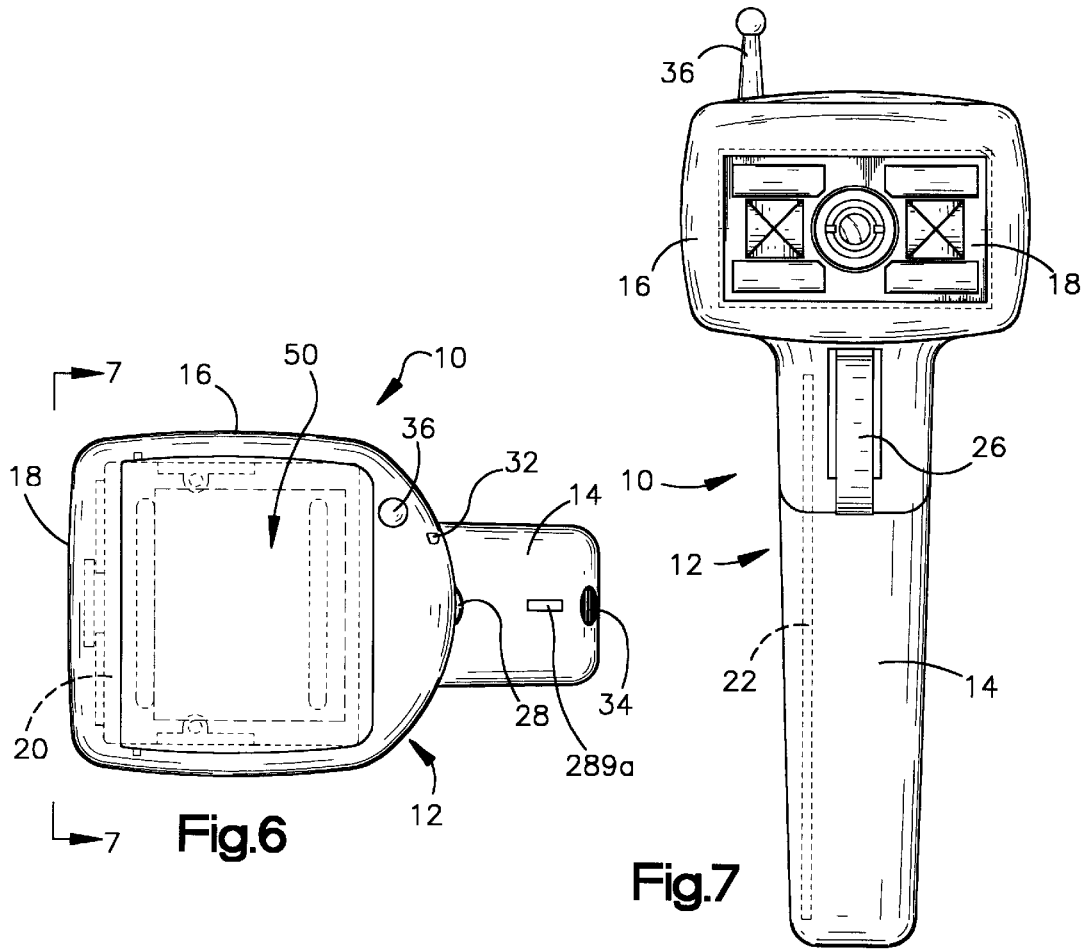
Fig.6
Fig.7

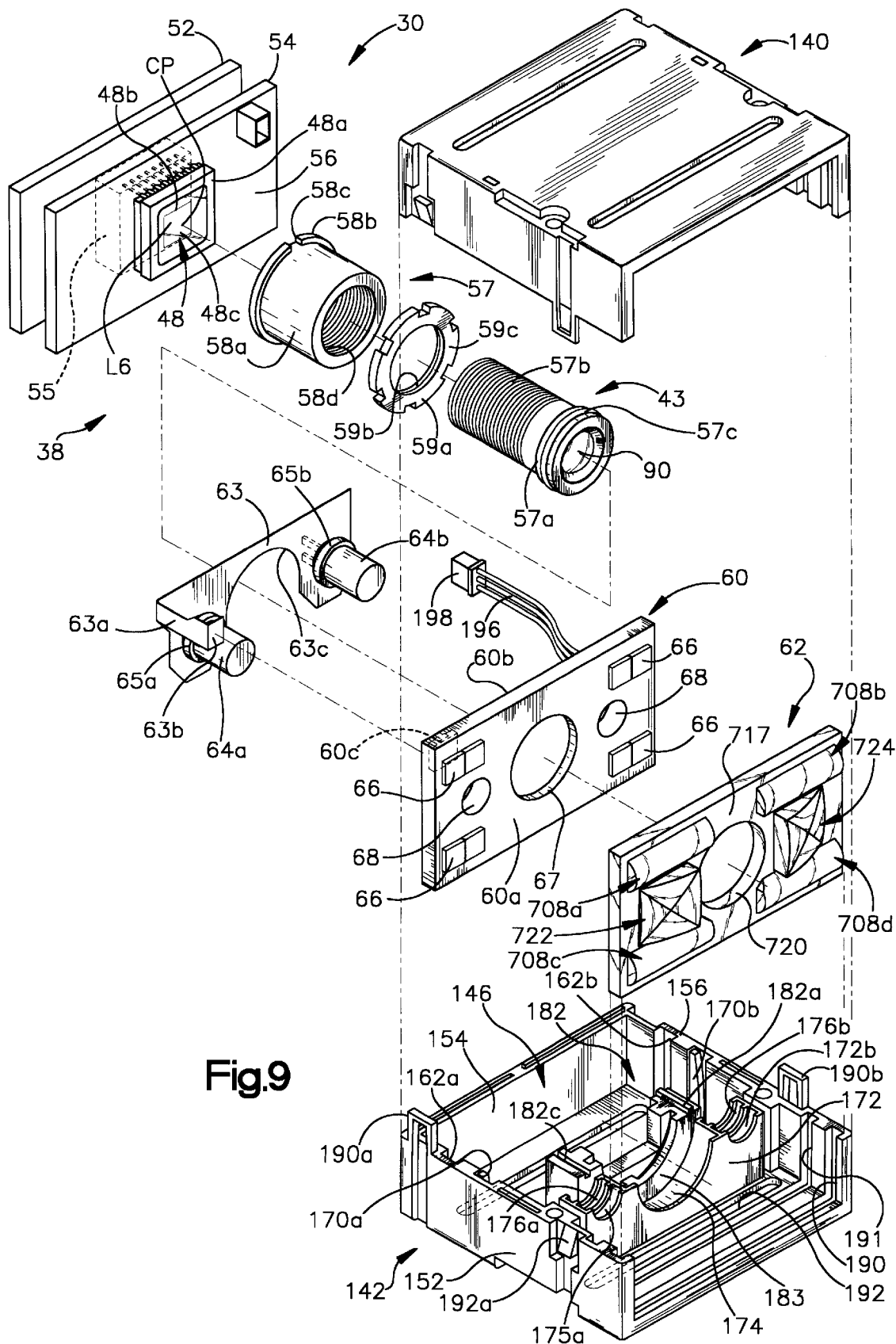

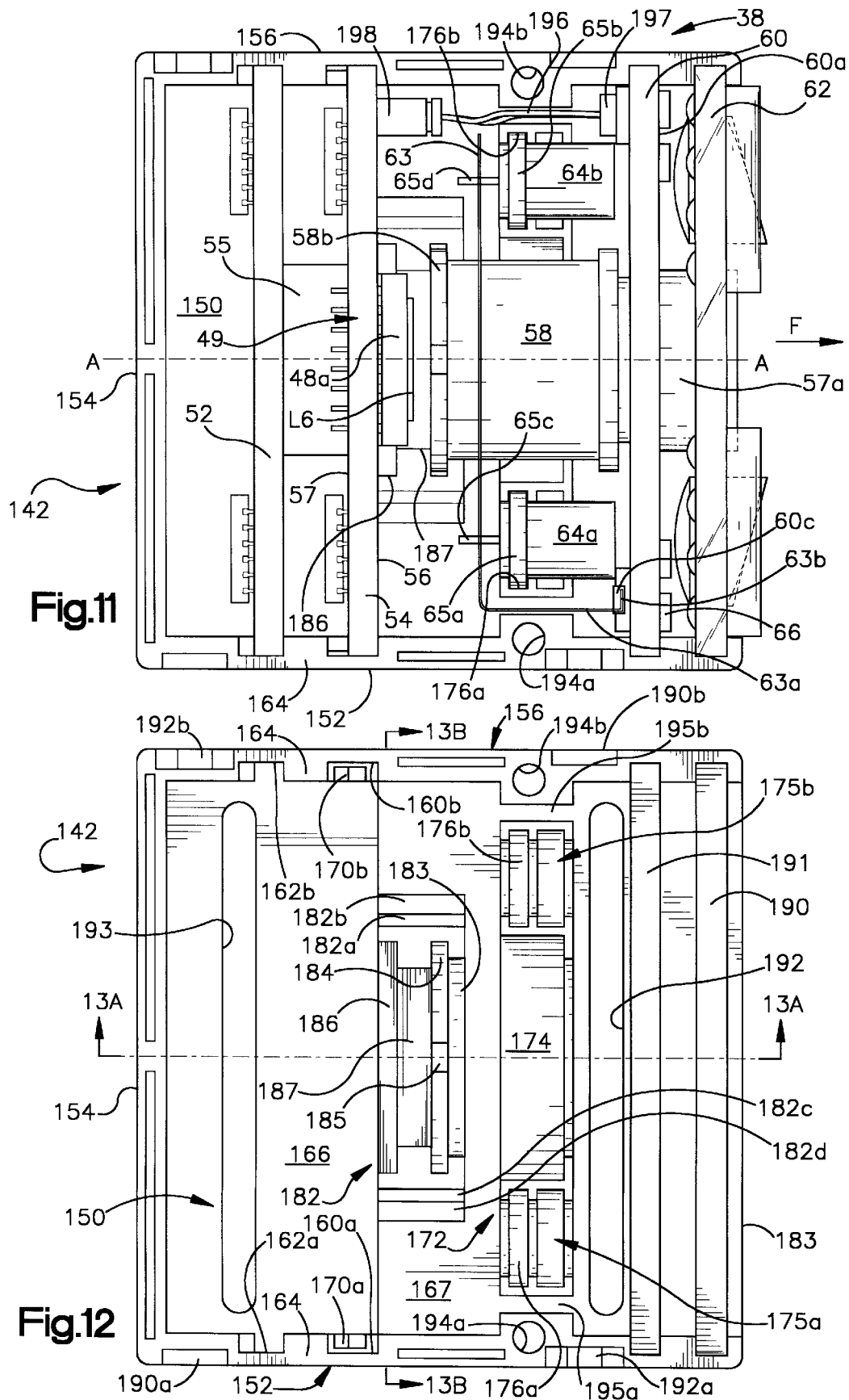

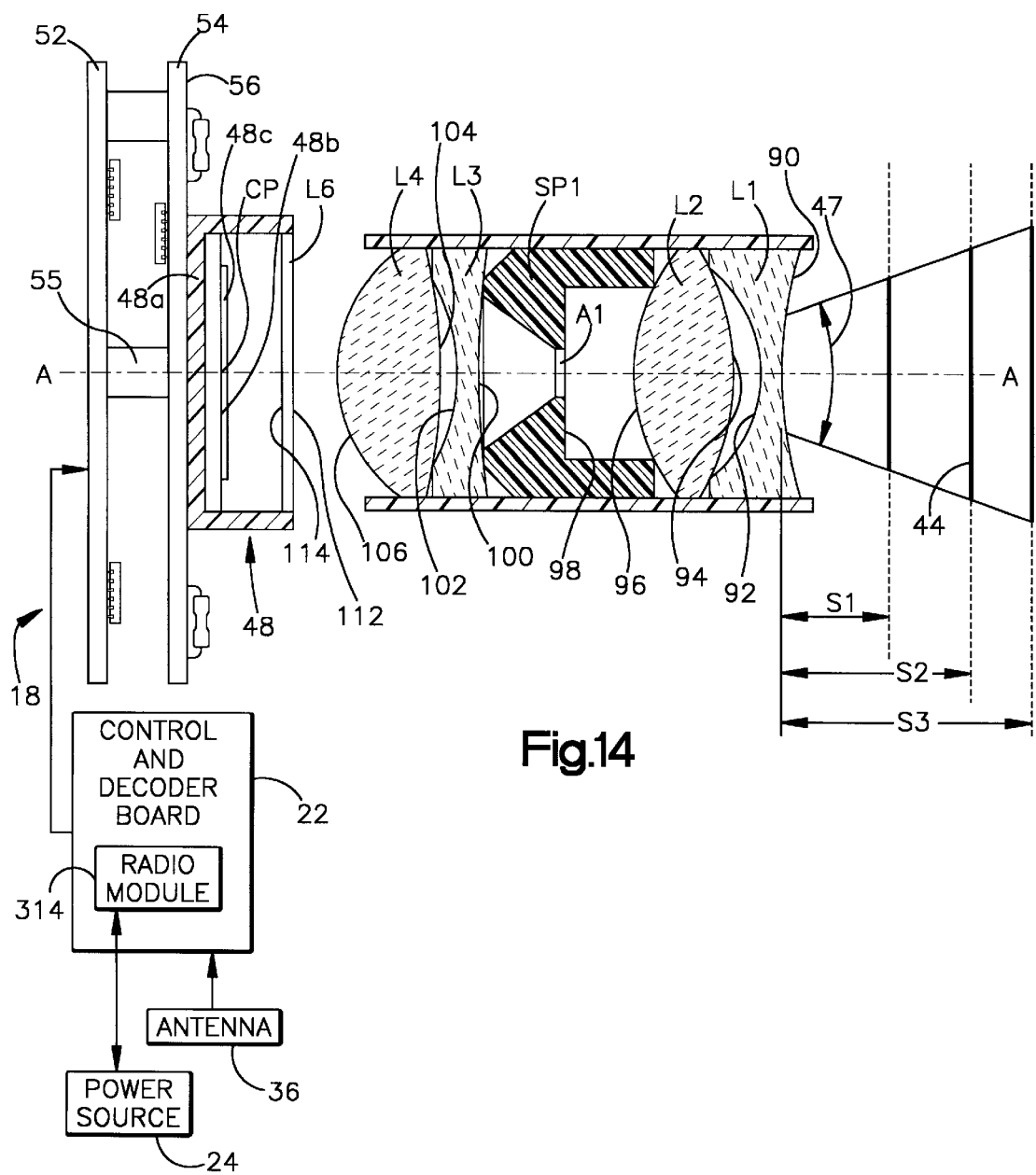

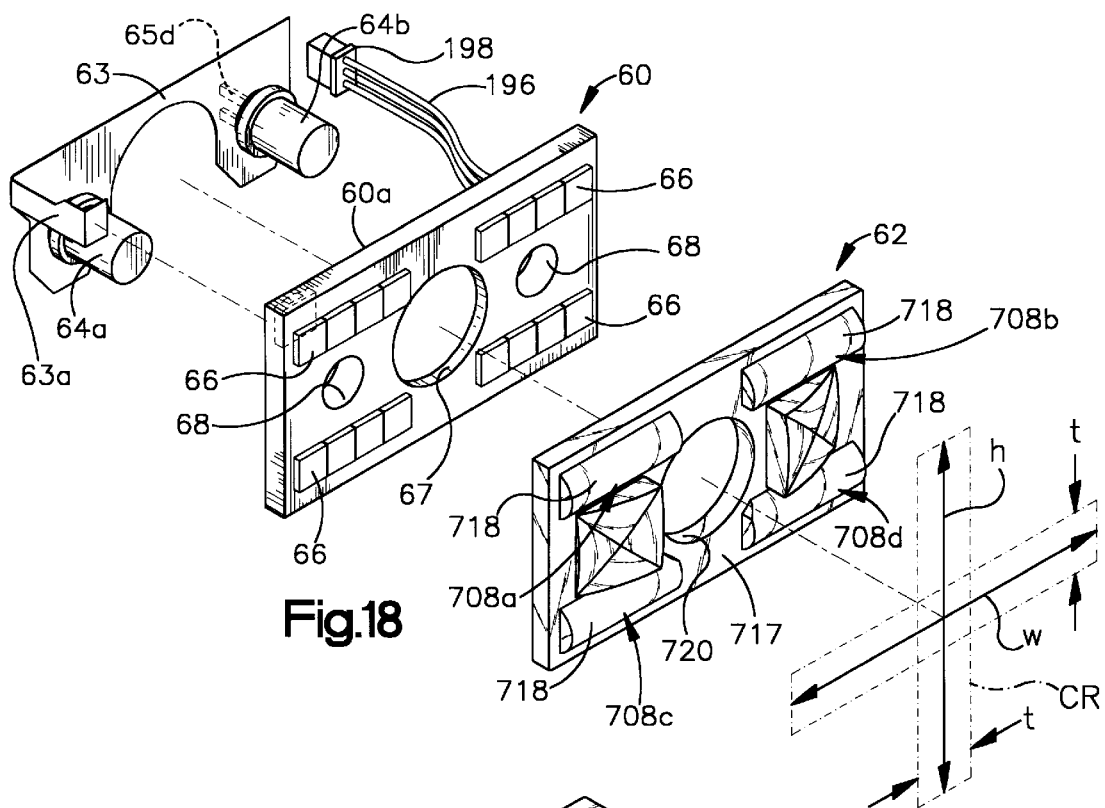
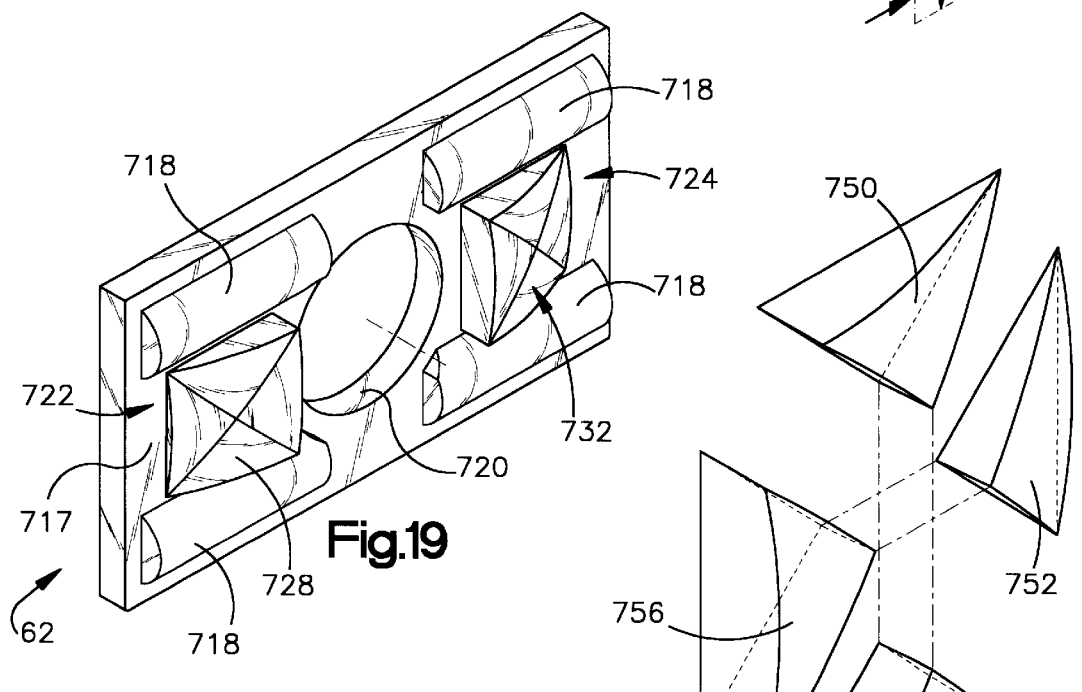
Fig.18
Fig.19
Fig.20

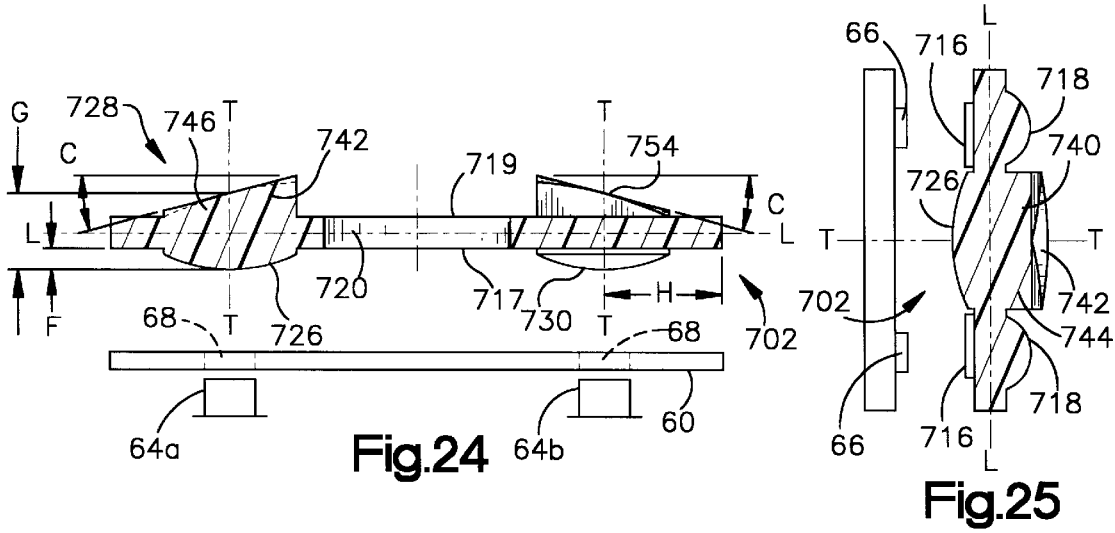
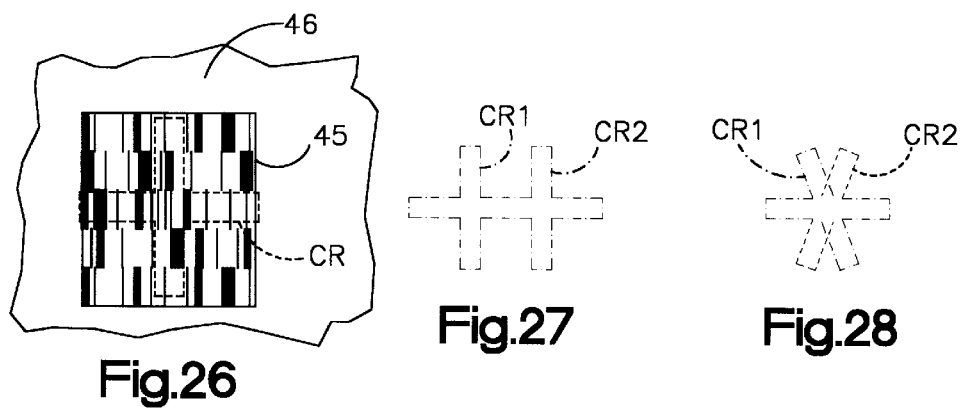
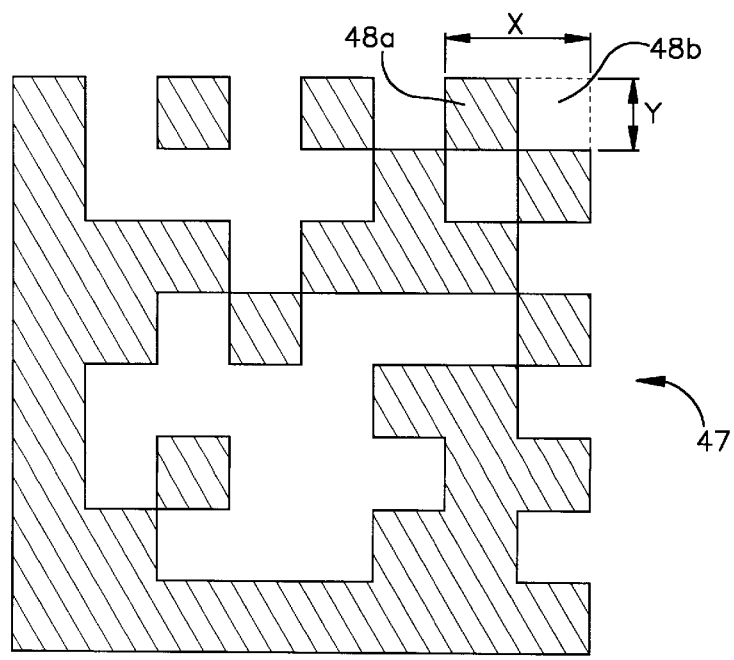

PORTABLE DATA COLLECTION DEVICE INCLUDING COLOR IMAGING DATAFORM READER ASSEMBLY

FIELD OF THE INVENTION

The present invention relates to a portable data collection device including a color imaging assembly and, more particularly, to a portable data collection device having a color imaging assembly including a color filter overlying a two dimensional photosensor array wherein the imaging assembly is selectively actuatable to read bar code and matrix dataforms and provide color images of a target object.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both laser scanners and CCD imaging assemblies are also capable of reading a "stacked" two dimensional (2D) bar code dataforms such as PDF417, which has row indicator patterns utilized by the reader for vertical synchronization which permit reading successive rows of bar code data.

A two dimensional (2D) imaging based dataform reader has been proposed in U.S. application Ser. No. 08/544,618, filed Oct. 18, 1995 and entitled "Extended Working Range Dataform Reader Including Fuzzy Logic Image Control Circuitry". The 2D dataform reader disclosed in application Ser. No. 08/544,618, which is assigned to the assignee of the present application, includes an imaging assembly having a two dimensional array of photosensors adapted to read 2D bar code dataforms (e.g., PDF417, SuperCode, etc.) with vertical synchronization row indicator patterns as well as matrix dataforms (e.g., MaxiCode, DataMatrix, etc.) which do not include vertical synchronization patterns. The individual photosensors correspond to image picture elements or pixels of the resulting image generated with the photosensors are read out after an exposure period or periods. The 2D dataform reader disclosed in application Ser. No. 08/544,618 utilizes an open loop feedback control system including fuzzy logic circuitry to determine proper exposure time and gain parameters for a camera assembly. Application Ser. No. 08/544,618 is incorporated in its entirety herein by reference.

In U.S. application Ser. No. 08/609,344, a portable data collection device with a color imaging assembly is disclosed. Application Ser. No. 08/609,344 is assigned to the assignee of the present invention and is incorporated in its entirety herein by reference. Application Ser. No. 08/609,344 proposed the use of a color board camera assembly including an RGB (red, green, blue) filter overlying a two dimensional photosensor array. A Y-C signal (Y—luminance signal) and C—chrominance signal) was generated by the color board camera assembly. While the RGB filter permitted color imaging, decoding a dataform image in a captured image frame was problematic. Use of the RGB filter required luminance values corresponding to the Y signal to be adjusted to compensate for changes the intensity of reflected light received by a photosensor depending upon the color of the filter element overlying the photosensor. Application Ser. No. 08/609,344 proposed several methods of compensating for changes in intensity of light directed onto a photosensor when a captured image includes an image of a dataform to be decoded. Even with compensation methods, use of a Y-C signal for dataform decoding has proven less efficient and effective than desired.

What is needed is a color imaging assembly for a portable data collection device that provides the advantage of color imaging with effective and efficient decoding of imaged dataforms.

SUMMARY OF THE INVENTION

In accordance with this invention, a portable data collection device is provided that includes a color imaging assembly. The color imaging assembly is selectively actuatable for reading bar code and matrix dataforms (dataform reading mode) and providing a color image of an item in the imaging assembly's target area (imaging mode). The imaging assembly of the present invention combines a two dimensional (2D) color photosensor array and board camera assembly which includes circuitry generating an industry-standard PAL ((phase-alternation line) analog composite video signal. The color photosensor array is comprised of a two dimensional array of photosensors overlaid by a mosaic color filter. The color filter includes filter elements or portions overlaying each of the photosensors of the photosensor array. The filter elements define a repeating pattern of four colors—green, magenta, yellow and cyan.

The composite analog video signal generated by the board camera assembly is converted to digital gray scale values and a set of gray scale values corresponding to a captured image frame is stored in a frame buffer memory. If the device is in the dataform reading mode, compensation circuitry is activated to adjust the gray scale values of corresponding to an imaged dataform in the captured image frame to adjust for the transmittivity differences of different color filter elements. The set of adjusted gray scale values are then subjected to cell extraction and decoding by cell extraction and decoding circuitry. If the device is in the imaging mode, conversion circuitry is activated to convert the gray scale values to either Y-C data (if the captured image is to be displayed on a television) or RGB data (if the captured image is to be displayed on a computer monitor).

The portable data collection device of the present invention thereby provides the advantage of being able to display a color image of the target area while utilizing a composite PAL video signal which avoids the distortion and errors inherent in using a board camera with circuitry generating a color Y-C signal, converting and compensating the Y-C signal to generate gray scale values for decoding a captured dataform image.

As discussed, the portable data collection device of the present invention includes two manually activated trigger switches for controlling the selection circuitry to select between a imaging capture mode and a dataform decoding mode. A first trigger switch, the dataform decoding trigger, institutes the dataform decoding mode and signals the selection circuitry to output a decoded representation of a dataform in a captured image frame. The second trigger switch, the imaging trigger, institutes the imaging mode and has two operating embodiments. In the first operating embodiment of the imaging mode, depressing the imaging trigger results in the imaging assembly capturing one frame of the field of view or target area of the camera assembly. In the second operating embodiment of the imaging mode, depressing the imaging trigger results in the imaging assembly continuously capturing successive frames as long as the trigger is depressed.

Advantageously, the portable data collection device of the present invention includes a voice capture module which captures and digitizes sound received through a microphone mounted on the device during actuation of the second trigger. This feature enables an operator to "attach" a verbal message to the captured image. The digitized signal representing the captured sound portion is processed by a voice compression module prior to output to the radio module or the terminal processing board.

The imaging assembly includes a modular camera assembly. The modular camera assembly includes the board camera having black and white imaging circuitry outputting the analog PAL composite video signal. Mounted to the board camera is a color photosensor array assembly including the two dimensional (2D) array of photosensors overlaid by the mosaic color filter. A control and decoder board is coupled to the board camera assembly and includes decoding circuitry, image compression circuitry, control and selection circuitry, serial output circuitry, exposure parameter control circuitry and image buffering circuitry including signal processing circuitry and a frame buffer memory. The signal processing circuitry includes synchronization extractor circuitry and analog to digital (A/D) converter circuitry for converting a composite video signal generated by the board camera assembly to digital image data. The decoding circuitry includes a decoder for decoding 1D and 2D bar code dataforms. The exposure parameter control circuitry includes fuzzy logic control circuitry for controlling the frame exposure period and gain adjustment of the board camera assembly.

The imaging assembly further includes compensation circuitry which operates on gray scale values stored in the frame buffer memory when the device is in the dataform reading mode and conversion circuitry to convert the gray scale values to Y-C and/or RGB values when the device is in the imaging mode. The gray scale values correspond to analog voltage magnitudes read out from individual photosensors of the photosensor array after an exposure period. The compensation circuitry utilizes an algorithm to adjust the gray scale values of at least a subset of the gray scale values stored in the frame buffer memory. The adjustment of a gray scale value compensates for the variation in an intensity in reflected illumination focused by the optic assembly onto a photosensor due to the color of the filter element overlying the photosensor.

The modular camera assembly includes a two piece symmetric housing defining an interior region in which components of the are supported. The components of the modular camera assembly include a board camera assembly comprising first and second printed circuit boards, one of which includes the 2D photosensor array mounted thereon. The modular camera assembly also includes an illumination assembly for illuminating a target object in the imaging assembly target area and an optic assembly for focusing reflected light from the target area onto the 2D array of photosensors of the photosensor array assembly.

The optic assembly includes a plurality of lenses positioned to the front of the 2D photosensor array for focusing reflected light from the target area onto the photosensor array. The optic assembly is configured to enable reading of normal density dataforms having a minimum cell size as small as 6.6 mil (0.0066 inches or 0.167 mm.). A multiple part shroud assembly supports lenses of the optic assembly and shrouds ambient illumination from the photosensor array. The board camera assembly includes the 2D photosensor array, exposure period control circuitry and gain control circuitry mounted on the printed circuit boards.

The illumination assembly includes an array of LED illuminators for uniformly illuminating the target area and a targeting arrangement including two targeting LED illuminators for generating a cross hair illumination intensity pattern for aiming the portable data collection device appropriately. A lens array is disclosed having a first targeting optics which generates a first crosshair illumination pattern and a second targeting optics generating a second crosshair illumination pattern, the first and second illumination patterns coinciding at a best focus position of an optic assembly of the imaging assembly. The illumination assembly includes a plurality of green LEDs emitting light to illuminate the target area. The green LEDs emit light having a wavelength of approximately 567 nanometers (nm.). At such a wavelength, the green, magenta and cyan filter elements have substantially equal transmittivity rates which provides for less image distortion.

A viewing assembly is provided to further aid in aiming the device at a target dataform or item. The viewing assembly includes a pivoting member that is manually pivotable into an upright position in a line of vision of the operator. The pivoting member defines an aperture. The operator holds the device at a fixed distance with respect to his or her viewing eye and looks through the aperture to view the target object. If the operator does not desire to use the viewing assembly, the pivoting member is folded down out of the operator's line of vision and out of harm's way.

BRIEF DESCRIPTION OF THE DRAWINGS

FIG. 1 is a perspective view of a portable data collection device of the present invention with a pivoting member of a viewing assembly in a folded down position;

FIG. 2 is a perspective view of the portable data collection device of FIG. 1 with the viewing assembly pivoting member in an upright position.

FIG. 3 is a sectional view of a portion of a housing of the portable data collection device of FIG. 1 and the viewing assembly pivoting member in the upright position;

FIG. 4 is a sectional view of a portion of a housing of the portable data collection device of FIG. 1 and the viewing assembly pivoting member in the folded down position;

FIG. 5 is a view partly in side elevation and partly in section showing use of the viewing assembly to aid in aiming the device;

FIG. 6 is a top view of the portable data collection device of FIG. 1;

FIG. 7 is a front elevation view of the portable data collection device of FIG. 1 as seen from a plane indicated by the line 7—7 in FIG. 6;

FIG. 9 is an exploded perspective view of the modular camera assembly of FIG. 8;

FIG. 11 is a top plan view of a the modular camera assembly of FIG. 8 with an upper half of the housing removed as seen from a plane indicated by the line 11—11 in FIG. 10;

FIG. 12 is a top plan view of a lower half of the modular camera assembly housing as seen in FIG. 11 with the modular camera assembly components removed;

FIG. 14 is a schematic representation of a plurality of lens of an optic assembly of the modular camera assembly;

FIG. 18 is an exploded perspective view of an illumination assembly of the modular camera assembly of the imaging assembly of the present invention;

FIG. 19 is a perspective view of a lens array or front panel of the illumination assembly of FIG. 18;

FIG. 20 is an exploded perspective view of a targeting optics of the front panel of FIG. 19;

FIG. 24 is a sectional view of the front panel of FIG. 19 as seen from a plane indicated by the line 24—24 in FIG. 21;

FIG. 25 is a sectional view of the front panel of FIG. 19 as seen from a plane indicated by the line 25—25 in FIG. 21;

FIG. 26 is a representation of a crosshair illumination pattern generated by the illumination assembly of FIG. 18 superimposed on a target two dimensional bar code dataform;

FIG. 27 is a representation of a separation of crosshair illumination patterns of two targeting optics of the illumination assembly of FIG. 18 caused by imaging with the portable data collection device at a distance from a target object significantly different than a best focus position of the optic assembly of the device;

FIG. 28 is a representation of an angular shift of crosshair illumination patterns of two targeting optics of the illumination assembly of FIG. 18 caused by imaging with the portable data collection device tilted such that the front panel is not substantially parallel to a surface of a target object;

FIG. 30 is a representation of a matrix dataform showing cell size;

DETAILED DESCRIPTION

Figure 8:
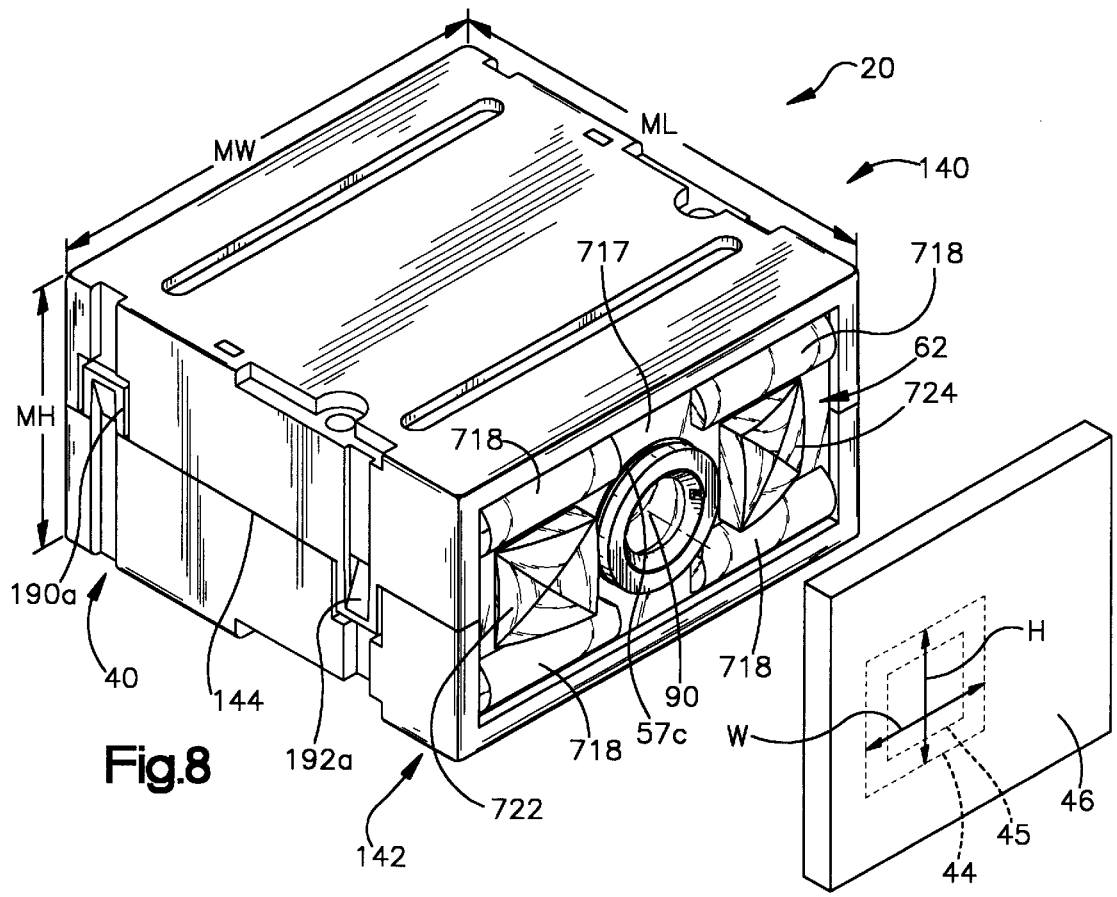
FIG. 8 is a perspective view of a modular camera assembly of an imaging assembly of the portable data collection device of the present invention, the modular portion shown imaging a target dataform affixed to a target item.

Turning to the drawings, a portable data collection device in accordance with the present invention is shown at 10 in FIGS. 1–8. The data collection device 10 includes a housing 12 defining an interior region. The housing 12 includes a gripping portion 14 sized to be grasped in the hand of an operator and an angled snout 16 extending from the gripping portion. With specific reference to FIG. 8, the snout 16 includes an opening through which a portion of a two dimensional (2D) photosensor array color imaging assembly 18 extends. The imaging assembly 18 includes a modular camera assembly 20 and a control and decoder board 22 electrically coupled to electronic circuitry of the modular camera assembly. The control and decoder board 22 is supported within the gripping portion 14 of the housing 12. Also supported within the housing gripping portion 14 is a power source 24 such as a rechargeable battery for supplying operating power to the portable data collection device 10.

A dataform reading trigger switch or actuator 26 extends through an opening in the gripping portion 14. Also extending through an opening in the gripping portion 14 is an imaging push button trigger switch or actuator 28. The dataform reading trigger 26 is positioned to be depressed by an index finger of the operator while the gripping portion 14 of the housing 12 is held in the operator's hand. The imaging trigger 28 is positioned to be depressed by a thumb of an operator while the gripping portion 14 of the housing 12 is held in the operator's hand.

The gripping portion 14 also includes a small openings through which a distal portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform or imaging a target area. The color red is displayed when the device 10 is not ready to perform an operation. Finally, the housing 12 includes an opening exposing a portion of a microphone 34 mounted in the housing interior region and another opening through which a radio antenna 36 extends.

A two position switch 289a also extends through an opening in the gripping portion 14. The switch 289a is positioned appropriately by an operator to generate a Y-C or an RGB analog output signal. Two data output ports 312, 326 also extend through openings in the gripping portion 14. The output port 312 is a serial data output port while the output port 326 is a analog signal output port for outputing either the Y-C or RGB analog output signal depending on the position of the switch 289a. The interior region of the housing 12 supports the color imaging assembly 18 and other electronic circuitry to be described below.

Referring to FIG. 8 and 9, which show perspective and exploded perspective views of the modular camera assembly 20 of the imaging assembly 18, it can be seen that the modular camera assembly 20 includes a housing 40 which supports an illumination assembly 42 and a board camera assembly 38. The board camera assembly 38 includes a color photosensor array assembly 49 mounted on a surface 56 of a printed circuit board 54. The printed circuit board 54 and another printed circuit board 52 support board camera circuitry that, when actuated, generates a black and white PAL composite video signal 262 (shown schematically in FIGS. 29B and 29B). The modular camera assembly 20 includes an optic assembly 43 which focuses an image of a target area 44 onto a color 2D photosensor array 48 (shown schematically in FIG. 14). Specifically, reflected light from the target area 44 is focused by the optic assembly 43 onto an outwardly facing, light receiving surface 48b of the photosensor array 48. The photosensor array 48 is part of a surface mounted integrated circuit (IC) chip 48a.

Figure 33A:
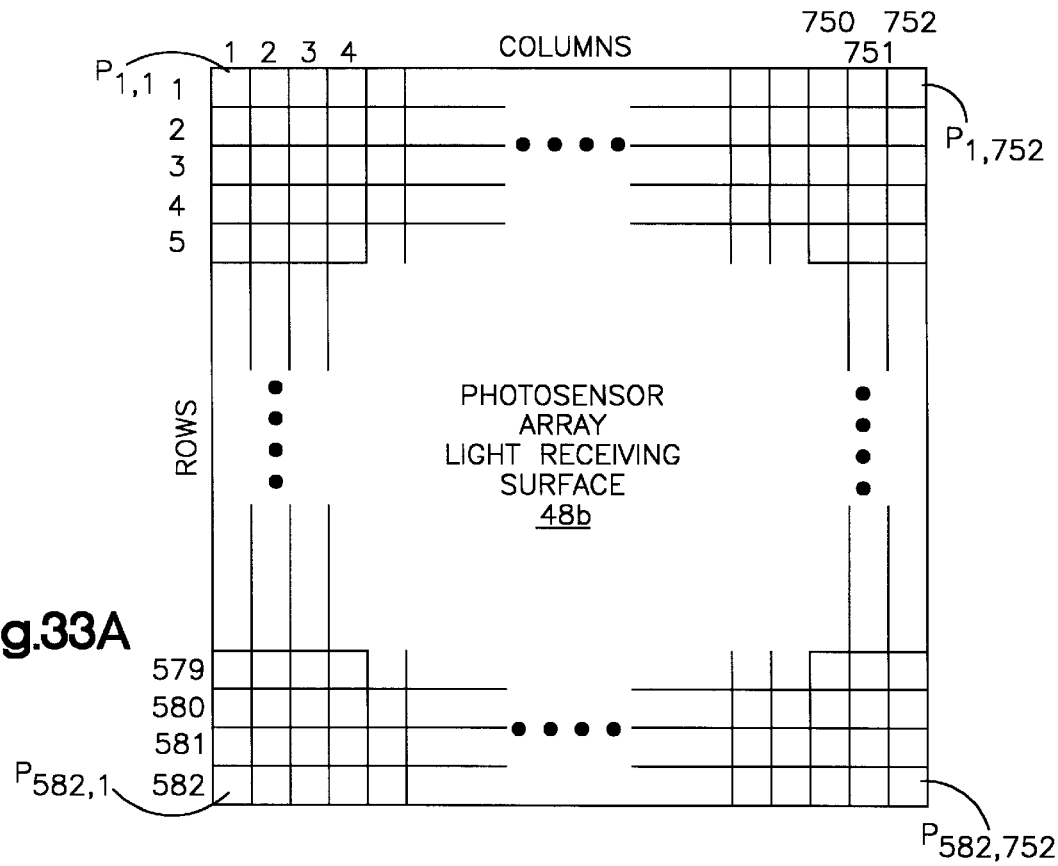
FIG. 33A is a schematic representation of a two dimensional photosensor array of the imaging assembly.
Figure 33B:
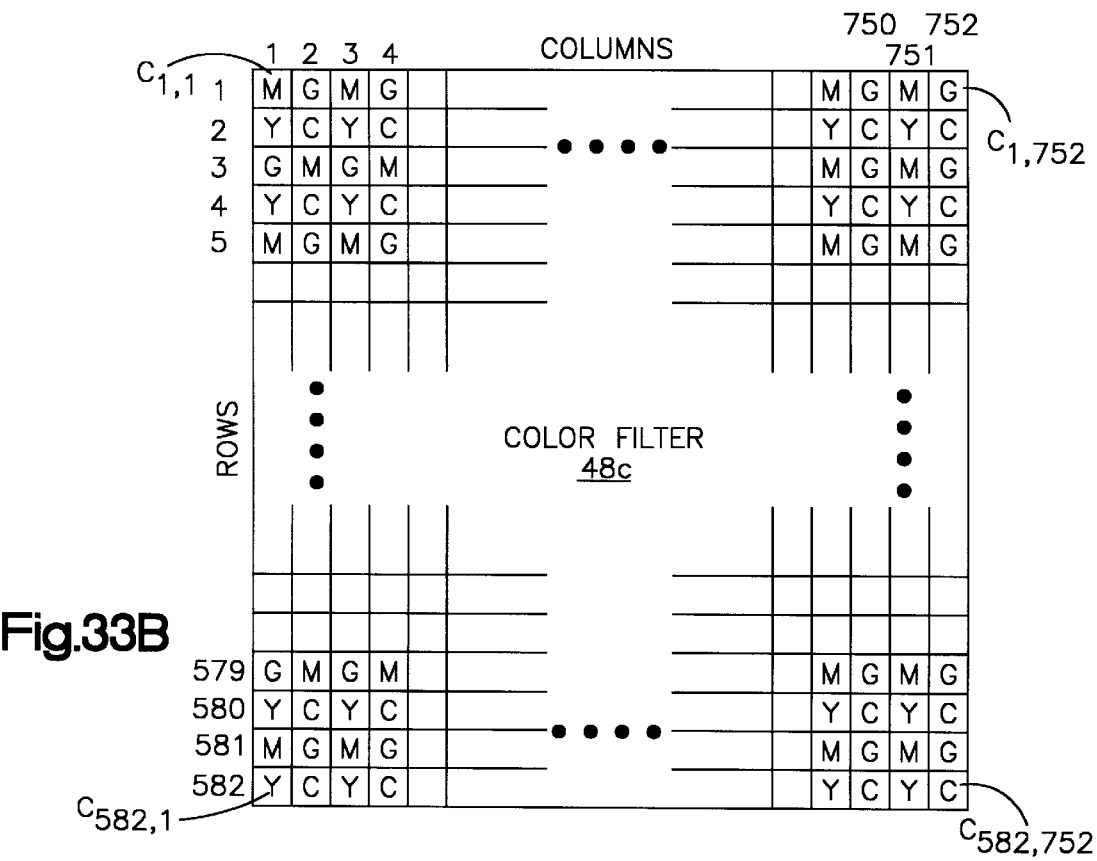
FIG. 33B is a schematic representation of a color filter overlying the two dimensional photosensor array of the imaging assembly.

The ability to produce color images is provided by a mosaic color filter 48c overlying the light receiving surface 48b of the photosensor array 48. The filter 49c comprises color portions or elements distributed in a repeating pattern (shown schematically in FIG. 33B). The color filter 48c overlies the photosensor array light receiving surface 48b. FIGS. 33A and 33B schematically depict the light receiving surface 48b of the photosensor array 48 and the color filter 48c. The photosensor array light receiving surface 48b includes an array of 584 rows by 752 columns of light sensitive photosensors for a total of 439,168 photosensors in the photosensor array. An image of the target area 44 is focused on the light receiving surface 48b. Light incident on a photosensor during an exposure period charges the photosensor. Subsequent to the exposure period, the photosensor charge is read out or discharged. The charge magnitude or voltage read out from a photosensor represents an integration of the intensity of the reflected light focused on the photosensor over the exposure period.

Each photosensor of the photosensor array 48 corresponds to a picture element or pixel of a captured image field or frame. For example, in FIG. 33A, the photosensor labeled P(1,1) is located at the intersection of row 1 and column 1 of the photosensor array. This photosensor P(1,1) corresponds to an individual pixel or pixel element of an image field or an image frame. The photosensors of the photosensor array 48 are read out in an frame mode interlaced format which means at a time t1, photosensors in every other row of the photosensor array are read out (e.g., rows 1, 3, 5, . . . , 581) to generate a first captured image field comprising 219,584 image pixels. At a later time t2, photosensors in the other rows are read out (e.g., rows 2, 4, 6, . . . , 582) to generate a second captured image field comprising 219,584 image pixels. The images represented in the first and second captured image fields, when appropriately interlaced row by row fashion comprise a full captured image frame comprising 439,168 image pixels.

As can be determined from examining FIGS. 33A and 33B, since the photosensor array light receiving surface 48b includes 439,168 photosensors, the color filter 48c also includes 439,168 color filter elements. The color filter 48c includes 109,792 green color filter elements (labeled G in FIG. 33B), 109,792 magenta color filter elements (labeled M in FIG. 33B), 109,792 yellow color filter elements (labeled Y in FIG. 33B) and 109,792 cyan color filter elements (labeled C in FIG. 33B). Each photosensor is overlaid by a corresponding color element of the color filter 48c. For example, photosensor P(1,1) is overlaid by a yellow color filter element labeled C(1,1) in FIG. 33B. Photosensor P(1,752) is overlaid by a green color filter element labeled C(1,752). Photosensor P(582,1) is overlaid by a yellow color filter element labeled C(582,1). Photosensor P(582,752) is overlaid by a cyan color filter element labeled C(582,752).

The positional pattern of the filter elements of corner portions of the color filter 48c are shown in FIG. 33B. It should be understood, of course, that the row and column patterns shown for the corner portions are repeated through the filter 48c. Physically, the color filter is applied to photosensor array light receiving surface 48b in the semiconductor fabrication process of the photosensor array IC chip 48a Specifically, the color filter 48c is applied to the photosensor array light receiving surface 48b using a mask work fabrication process and utilizes filter materials which have been empirically determined to transmit light only within certain wavelength bands. A suitable two dimensional photosensor array IC chip 48a having a color filter is the Model No. ICX059AK IC two dimensional photosensor array chip marketed by Sony of Japan.

The target area 44 is defined by a field of view of the board camera assembly 38 and is represented in FIG. 8 by the dimensions labeled "H" (for height of target area 44) and "W" (for width of the target area 44). The illumination assembly 42 includes four illumination optic portions 88a, 88b, 88c, 88d which project a uniform intensity distribution of illumination across the target area 44. The illumination assembly 42 also includes a targeting arrangement including targeting LEDs 64a, 64b, which, when energized, project illumination through first and second targeting optics 72a, 74a thereby generating a crosshair targeting illumination pattern CR (FIG. 18) to aid in aiming the device 10. To avoid image distortion, the targeting pattern CR is turned off by the imaging assembly 18 when the image frames of the target area 44 are being captured.

The color imaging assembly 18 is capable of decoding a target dataform 45 affixed to an object 46. The target dataform 45 may be a one dimensional bar code dataform such as Codabar, Code 39, Code 93, Code 128, Interleaved 2 of 5, and UPC/EAN; a two dimensional bar code dataform such as PDF417 and SuperCode; or a matrix dataform such as MaxiCode and DataMatrix. The optic assembly 43 of the present invention is specifically configured to permit reading by the imaging assembly of standard density dataforms having a minimum cell size of 6.6 mils (0.0066 in. or 0.167 mm.). The minimum cell size of a dataform is defined as the smallest dimension of a separately readable information conveying portion of the dataform.

As an example, FIG. 30 shows a DataMatix dataform at 47. (DataMatrix is a binary symbology of International Data Matrix, Inc. of Clearwater, Fla. and is described in U.S. Pat. No. 5,473,151 to Priddy et al.) The two visual squares labeled 48a, 48b, with 48a being a dark block and 48b being a light block labeled may constitute a separately readable information conveying portion of the dataform 47, namely, the letter "B". The cell size of the letter "B" would be the horizontal and vertical dimensions labeled "x" and "y" in FIG. 30. As can be seen, the vertical dimension "y" is one half the size of the horizontal dimension "x". Thus, the minimum cell size for the letter "B" would be the vertical dimension "y". Additionally, the imaging assembly 18 is capable of capturing an image of the two dimensional target area 44.

Viewing Assembly 50

Referring again to FIGS. 1–7, a top portion of the housing upper snout 16 supports a viewing assembly 50 which may optionally be used to aid in aiming the device 10 such as at the target dataform 45 or the target object 46. The viewing assembly 50 includes a pivoting member 102 which pivots between a folded down position (FIGS. 1 and 3) and an upright position (FIGS. 2 and 4). The pivoting member 102 includes a rectangular opening 104. The opening 104 is approximately 32 mm. in the horizontal direction, labeled 106 in FIG. 2, and is approximately 24 mm. in the vertical direction, labeled 108 in FIG. 2. The ratio of the horizontal dimension 106 to the vertical dimension 109 is chosen to correspond to the ratio of the horizontal dimension to the vertical dimension of the matrix of photosensors comprising the 2D photosensor array 48. As can be seen in FIG. 5, when in an upright position, the pivoting member 102 aids an operator 105 is aiming the device 10 such that the field of view or target area 44 of the imaging assembly 18 overlies the target dataform 45 affixed to the object 46. The vertical and horizontal dimensions 106, 109 are chosen such that if a distance ED (FIG. 5) between the pivoting member 102 and the eye of the operator 105 is 90 mm. (3.5 in.) and a distance TD between the pivoting member and the target dataform 45 is 140 mm. (5.5 in.), the target area seen through the rectangular opening 104 is substantially equal to the target area 44 of the imaging assembly 18.

The pivoting member 102, when in the folded down position, is received in a well or recessed area 108 defined by an upper surface 113 of the housing snout 16. In the folded down position, an upper surface 112 (FIG. 4) of the pivoting member 102 is substantially flush with the snout upper surface 113. The snout upper surface 113 includes a recessed portion 114 (FIGS. 3 and 4) sized to permit an operator's finger tip to slip under a front lip 116 of the pivoting member 102 to permit the member to be popped up to the upright position from the folded down position As can best be seen in FIGS. 3 and 4, the pivoting member front lip 116 fits under a slightly extending upper edge 117 of the snout upper surface 113 to hold the pivoting member 102 with a slight interference fit in the folded down position.

The pivoting member 102 pivots on a pair of cylindrical portions 118 which extend from sides of the pivoting member near its bottom edge. The cylindrical portions 118 rotatably fit within corresponding cylindrical recesses in the snout 16". Turning to FIGS. 3 and 4, an arcuate biasing spring 120 positioned in a recessed portion 122 of the snout 16. The recessed portion 122 is shaped to confine the spring 120 with edge portions of the snout defining the recessed portion. The spring 120 has a humped middle portion which biases the pivoting member 102 to either the upright position or the folded down position.

Modular Camera Assembly Housing 40

The modular camera assembly 20 is shown in FIGS. 8–13B. Suitable exterior dimensions for the housing 40 are as follows:

| Housing | Label | Dimension |
| --- | --- | --- |
| Height | MH (FIG. 8) | 1.02 in. (26 mm,) |
| Width | MW (FIG. 8) | 1.65 in. (42 mm.) |
| Length | ML (FIG. 8) | 1.57 in. (40 mm.) |

The housing 40 includes an upper portion 140 and a symmetrical lower portion 142. The upper and lower portions 140, 142 are advantageously identically shaped and positioned symmetrically about a part line 144 and define an interior region 146 (FIG. 9) in which components of the modular camera assembly 20 are supported. Since the upper and lower portions 140, 142 are symmetrical, only the construction of the lower portion 142 will be discussed with the understanding that the same construction and features are present in the mating upper portion 140. In this way, fabrication and assembly of the modular camera assembly 20 is simplified because the housing portions 140, 142 are interchangeable and, therefore, only one configuration needs to be fabricated.

As can best be seen in FIGS. 9, 12, 13a and 13b, the housing lower portion 142 includes a substantially flat base 150 and three side walls 152, 154, 156 extending perpendicularly from the base 150. An inner surface of the side wall 152 includes two spaced apart slots 160a, 162a extending from an upper edge 164 of the housing lower portion 142 defined by the side walls 152, 154, 156 to an inner surface 166 of the base 150. Similarly, an inner surface of the side wall 156 includes matching spaced apart slots 160b, 162b extending from the upper edge 164 of the housing lower portion 142 to the inner surface 166 of the base 150.

Figure 13A:
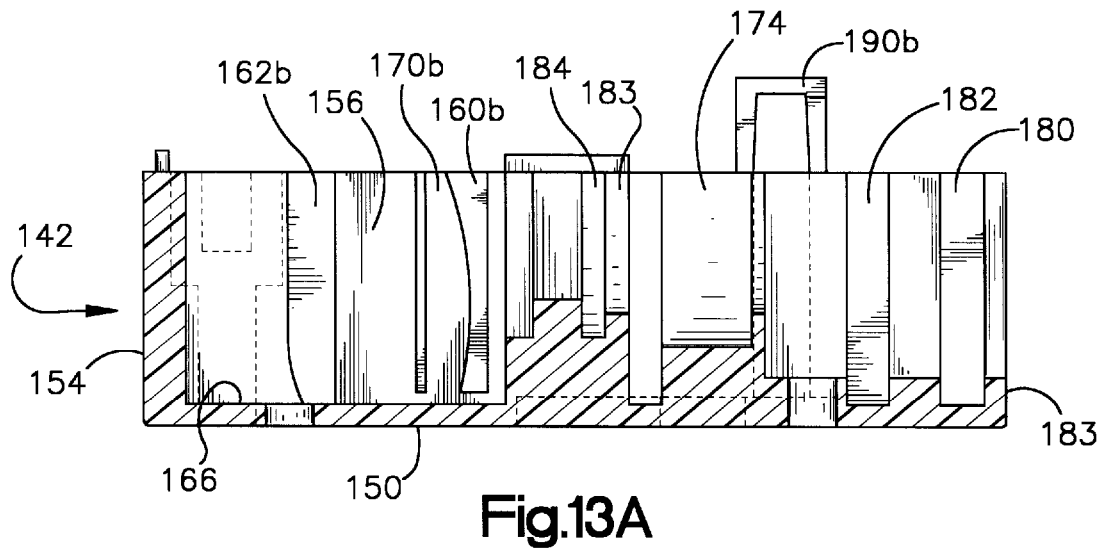
FIG. 13A is a sectional view of the lower half of the modular camera assembly housing as seen from a plane indicated by the line 13A—13A in FIG. 12.

The modular camera assembly 20 includes circuitry mounted on a set of two parallel, spaced apart rear and front printed circuit boards 52, 54 affixed to a spacer element 55 (FIGS. 11 and 14). The slots 162a, 162b receive and securely hold the rear printed circuit board 52 (FIG. 11) while the slots 160a, 160b receive the front printed circuit board 54. Mounted on a front surface 56 of the front printed circuit board 54 is a two dimensional photosensor array 48 of a photosensor array assembly 49. The optic assembly 43 must be precisely aligned with the photosensor array 48 to insure proper imaging of the target area 44. Spring like projections 170a, 170b (FIGS. 9 and 12) extend upwardly from the base inner surface 166. As can best be seen in FIG. 12, the projections 170a, 170b are spaced from their respective side walls 152, 156 but are still within regions defined by the slots 160a, 160b. When the printed circuit boards 52, 54 are inserted in their respective slots 162a, 162b, 160a, 160b, the projections 170a, 170b flex and push in a horizontal direction against a back side 57 (FIG. 11) of the printed circuit board 54 in a direction labeled F to insure the boards 52, 54 are securely held in place and the photosensor array 48 is precisely located. Additionally, as can be seen in FIGS. 12 and 13A, the slots 162a, 162b are tapered adjacent the base inner surface 166. The slots 162a, 162b become narrower near the base 150 thereby forcing the printed circuit board 52 in the direction F. The taper of the slots 162a, 162b combined with the projections 170a, 170b in the slots 160a, 160b apply sufficient force to the printed circuit boards 52, 54 so as to eliminate any "play" of the rear and front printed circuit boards 52, 54 in their respective slots.

The housing lower portion 142 also includes first and second supports 172, 182 extending upwardly from a slightly raised portion 167 (FIG. 12) of the base inner surface 166. As can best be seen in FIGS. 9, 11 and 12, the first support 172 includes a central portion 174 with a semicircular recess flanked by two outerlying portions 175a, 175b having smaller semicircular recesses. The central portion 174 supports an outer shroud 58a of the optic assembly 43. The two smaller outerlying portions support respective targeting light emitting diodes 73a, 73b of the illumination assembly 42. The targeting LEDs 64a, 64b are cylindrically shaped and include enlarged diameter base portions 65a, 65b (best seen in FIG. 11) which fit into inwardly stepped semicircular recesses 176a, 176b of the outerlying portions 175a, 175b. A first end portion 183 of the second support 182 includes a semicircular recess which supports the outer shroud 58a. Just inward of the end portion 183 is a portion 184 (FIGS. 12 and 13A) defining another semicircular recess having a slightly larger diameter than the recess of the end portion 183. The portion 184 is sized to receive an outwardly flared end portion 58b of the outer shroud 58a and thereby position it precisely with respect to the photosensor array 48. The outwardly flared end portion 58b of the outer shroud 58a includes two small cut out portions 59c (only one of which can be seen in FIG. 9). One of the cut out portions 59c fits onto a raised 185 nub of the semicircular shaped portion 184 to prevent the outer shroud 59a from rotating within the housing 40. The other cut out portion 59c, of course, fits onto an identical nub (not shown) of the upper housing portion 140 which is identical in shape and configuration to the lower housing portion 142.

Figure 13B:
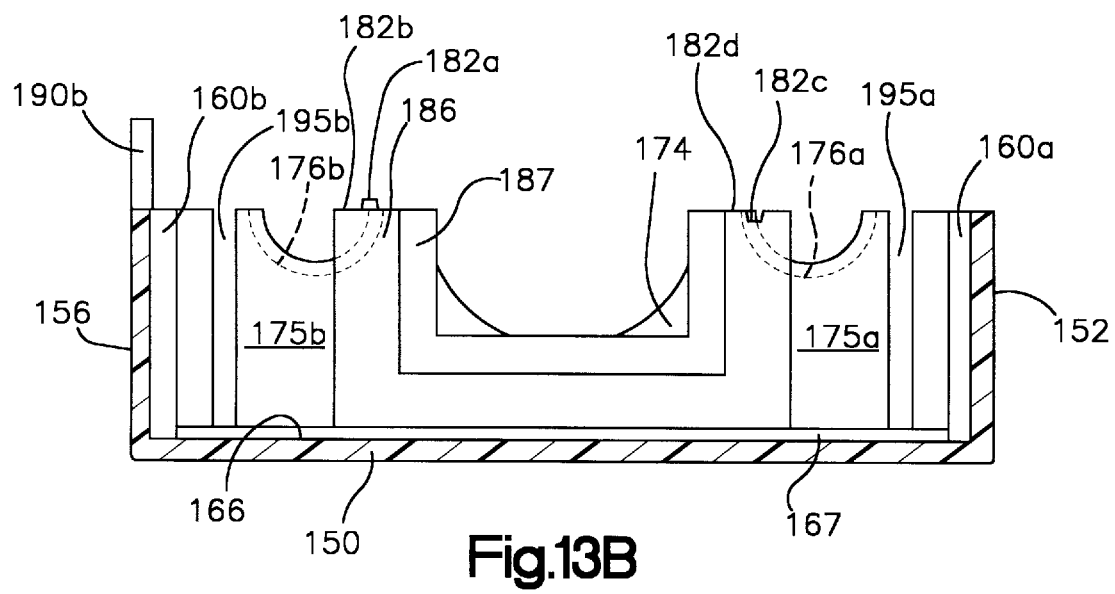
FIG. 13B is another sectional view of the lower half of the modular camera assembly housing as seen from a plane indicated by the line 13B—13B in FIG. 12.

As can best be seen in FIG. 13B, a second end portion 186 of the second support 182 includes a rectangular shaped recess. Disposed between the second end portion 186 and the portion 184 is a portion 187 (FIGS. 12, 13A and 13B) defining a rectangular shaped recess that is slightly smaller size than the recess defined by the end portion 186. As can be seen in FIG. 11, the recess of the portion 184 receives an extending portion of the photosensor array IC chip 48a. The photosensor array chip 48a is mounted to the front surface 56 of the printed circuit board 54. The front surface 56 of the printed circuit board 54 abuts the second support end portion 186 and, thus, the light receiving surface 48b of the photosensor array 48 is precisely positioned with respect to the support and with respect to the optic assembly 43 both in terms of a distance between the lens L5 of the optic assembly and photosensor array 48 and the perpendicularity between a longitudinal axis through the lenses L1, L2, L3, L4 and the light receiving surface 48b of the photosensor array 48. The light receiving surface 48b is coincident with the image plane of the optic assembly 43. As can best be seen schematically in FIG. 14, the light receiving surface 48b is overlaid by the color filter 48c. Spaced from the photosensor array 48 is an overlaying protective lens L5 supported by an upper surface of the IC chip 48a The shroud assembly outer shroud 58a and the second support 182 function to prevent ambient light from impinging on the photosensor array 48. When the housing upper and lower portions are 140, 142 are assembled, the second support 182 of the two portions encircle the outer shroud end 58a and the photosensor array 48.

As can be seen in FIGS. 9, 12 and 13B, a raised ledge 182a extends upwardly from an upper surface 182c of one side of the second support 182. A mating recess 182c is formed in an upper surface 182d of the opposite side of the second support 182. When the upper and lower housing portions 140, 142 are assembled, the raised ledge 182a of the lower housing portion 142 is received in a mating recess in an upper surface of a second support of the upper housing portion 140. The mating recess of the upper housing portion 140, of course, is identical to the recess 182c of the lower housing portion 142 as the portions 140, 142 are identical in configuration. Similarly, the mating recess 182c of the lower housing portion 142 receives a raised ledge of an upper surface of the second support of the upper housing portion. The raised ledge of the upper housing portion 140, of course is identical to the raised ledge 182a of the lower housing portion 142. The interlocking of the respective raised ledges 182a and mating recesses 182c of the second supports 182 of the housing upper and lower portions 140, 142, insure the area between an end 58a of the shroud assembly 57 and the photosensor array support 49 is light tight. In addition to preventing ambient light from impinging on the photosensor array 48, the second support 182 of the housing upper and lower portions 140, 142 support the shroud assembly 58 and insure that the optical axis A-A through the centers of the lenses L1, L2, L3, 14 and the pinhole aperture A1 of the spacer member SP1 is perpendicular to the light receiving surface 48b of the photosensor array 48 and is also aligned with the center point CP of the photosensor array 48.

The housing lower portion 142 includes two u-shaped latches 190a, 190b extending upwardly from the upper edge 164 of the respective side walls 152, 156 and two tapered detents 192a, 192b in recessed portions of the side walls 152, 156 that engage similar detents and latches of the upper portion 140 to seal the mating upper and lower housing portions 140, 142. As can be seen in FIG. 8, the two latches 190a, 190b engage respective detents in the housing upper portion 140 corresponding to the detents 192a, 192b of the housing lower portion. Similarly, the detents 192a, 192b are engaged by u-shaped latches of the upper portion. The latches are flexible enough to deflect as they traverse their respective tapered detents and then snap into engagement position once the central openings of the detents pass the detents. The lower housing includes to apertures 194a, 194b (FIGS. 11 and 12) which align with identical apertures of the upper portion 140 to facilitate affixing the module 20 within the housing extending snout 16. The circuit board 60 supports a plurality of surface mount illumination LEDs affixed to a front surface of the board 60. When the housing upper and lower portions 140, 142 are assembled, ventilation of the electronic components supported therein including the board camera assembly 38 and the illumination assembly 42 is provided by two elongated openings 192, 193 (FIG. 12).

Two slots 195a, 195b (as seen in FIGS. 12 and 13B) are disposed between 0 the two outerlying portions 175a, 175b and portions of the side walls 152, 156 surrounding apertures 194a, 194b. One of the slots 195a, 195b provide a passageway for a plurality of conductive leads 196 extending between a conductor 197 affixed to a back side 60a of the circuit board 60 and a conductor 198 affixed to the front side 56 of the second circuit board 54 of the board camera assembly 38. The other of the slots provides a passage for an angled extending portion 63a (FIG. 18) of a flexible printed circuit board 63. The circuit board 63, typically referred to as "circuit on flex", electrically connects the leads 65c, 65d extending rearwardly from the targeting LEDs 64a, 64b with circuitry on the circuit board 60 to permit selective energization of the LEDs 64a, 64b to aid in aiming the device 10 at a target object or dataform A front section 63b of the flexible printed circuit board 63 is coupled to the circuitry on the circuit board 60 through a connector 60c disposed on the back of the circuit board 60.

Modular Camera Assembly Components

Disposed in the interior region 146 of the modular housing 40 are the board camera assembly 38, the illumination assembly 42 and the optic assembly 43. The board camera assembly 38 includes the rear printed circuit board 52 and the front printed circuit board 54. The photosensor array IC chip 48a is disposed on the front surface 60a (FIG. 9) of the front printed circuit board 54. The light receiving surface 48b of the photosensor array 48 receives reflected illumination from the target area 44 focused through the optic assembly 43. As explained above, the light receiving surface 48b of the photosensor array 48 is overlaid by the color filter 48c.

The illumination assembly 42 includes a printed circuit board 60, a lens array 62 and two targeting LEDs 64a, 64b. The lens array 62 functions as the outer or front panel of the modular camera assembly 20. The term "front panel" will be used interchangeably with the term "lens array" throughout. A plurality of exposure LEDs 66 are disposed on the front surface of printed circuit board 60 to direct illumination through the lens array 62 towards the target area 44. The flexible printed circuit board 63, which route power to the targeting LEDs 64a, 64b, is also electrically coupled to the circuit board 60. The flexible printed circuit board 63 has a central unshaped cut out region 63c to provide clearance for the outer shroud 58a of the shroud assembly 57. The targeting LEDs 64a, 64b, when energized, project targeting illumination through openings 68 in the circuit board 60 and through targeting optics 722, 724 of the lens array 62 to form the crosshairs light or illumination pattern CR which aids in aiming the device 10 at the target dataform 45 or target object 46.

Optic Assembly 43

Figure 15:
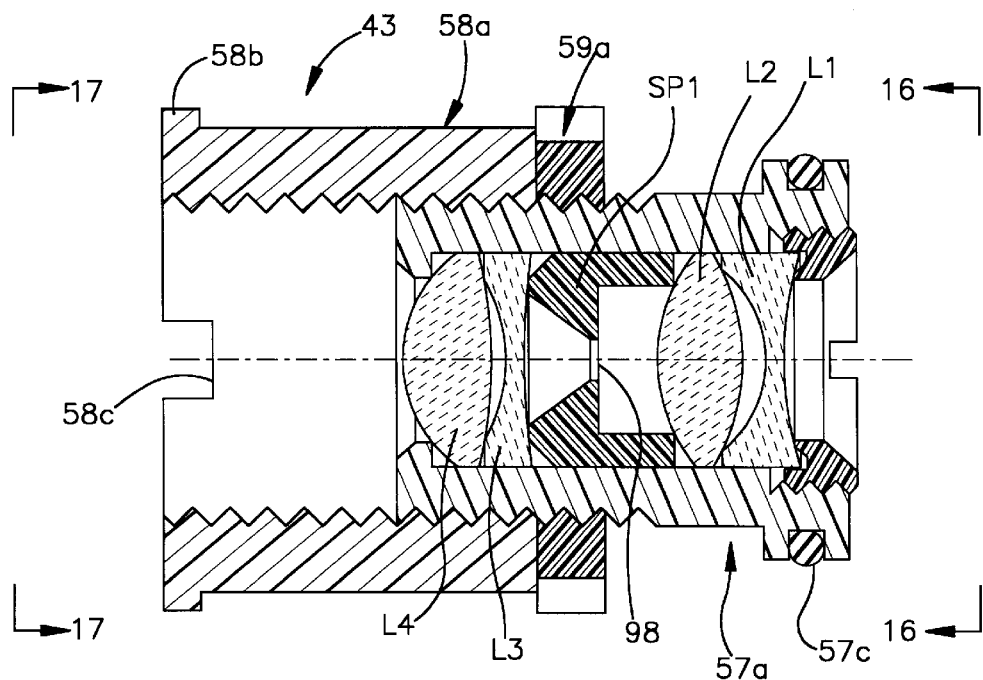
FIG. 15 is a view, partially in side elevation and partially in section of the optic assembly of the modular camera assembly.
Figure 16:
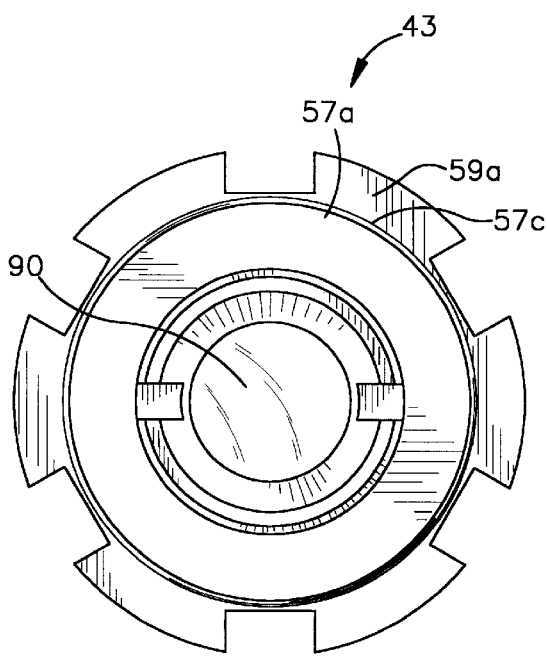
FIG. 16 is a front elevation view of the optic assembly of the modular camera assembly as seen from a plane indicated by the line 16—16 in FIG. 15.
Figure 17:
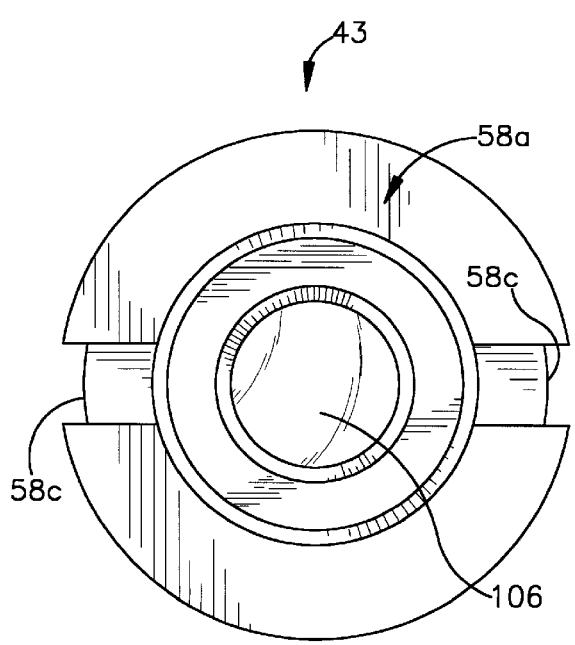
FIG. 17 is a rear elevation view of the optic assembly of the modular camera assembly as seen from a plane indicated by the line 17—17 in FIG. 15.

FIG. 14 shows a cross section of the camera assembly 38 with the optic assembly 43 focusing an image of the target area 44 onto the photosensor array 48. The performance of the portable data collection device 10 is enhanced by the optic assembly 43 which enables imaging and decoding of dataforms with a minimum cell size of 6.6 mil (0.168 mm.). The optic assembly 43 includes a shroud assembly 57 (FIGS. 9 and 15) and a lens assembly LA (FIG. 14). The lens assembly LA includes lenses L1, L2, L3, L4 and a spacer member SP1 with a small central aperture A1 (1.17 mm. in diameter) all supported within an inner cylindrical shroud 57a (best seen in FIG. 9). The lens assembly LA also includes a lens L5 which is supported by an upper surface of the photosensor array IC chip 48a Thus, there are eleven optic surfaces (including the portion of the spacer member SP1 defining the aperture A1) labeled 90, 92, 94, 96, 98, 100, 102, 104, 106, 108, 110 in FIG. 14. The shroud assembly 57 also includes a look nut 59a and the outer shroud 58a. The lock nut 59a includes internal threads 59b which thread onto external threads 57b of the inner shroud 57a. When the lock nut 59a is properly positioned on inner shroud threads 57b, the inner shroud 57a is threaded into internal threads 58d of the outer shroud 58a. When assembled, the forward facing surface 59c of lock nut abuts a back surface 60b of the printed circuit board 60. As explained above, the outer shroud 58a is securely held in place by the second support 182 of the upper and lower housing portions 140, 142 thereby insuring a proper perpendicular angle relationship between an optical axis through the optic centers of each of the lenses L1, L2, L3, L4 and the outward facing, light receiving surface 48b of the photosensor array 48.

Additionally, the lock nut 59a facilitates precise positioning of the lenses L1, L2, L3, L4 of the lens assembly LA with respect to the longitudinal displacement of the lenses along an optical axis labeled A-A in FIG. 11. The precise positioning of the lenses L1, L2, L3, L4, L5 with respect to the photosensor array 48 permits the sharpest possible image of the target dataform 45 to be directed on the center point CP of the light receiving surface 48b of the photosensor array 48. As can best be seen in FIG. 15, an O-ring 57c is disposed in a annular groove in the outer surface of the inner shroud 57a. The O-ring 57c seals against a central opening 720 of the lens array 62 to prevent external contaminants from entering the interior region 146 of the modular housing 140.

Turning to FIG. 14, based on the distance between the optic assembly 43 and the photosensor array 48, for a given dataform minimum cell size or dimension, there exists a best focus position S2 in front of the forward-most surface 90 of the lens L1 of the optic assembly 43 at which an image of the target dataform 45 in the target area 44 will be focused sharpest on a center point CP of the light receiving surface 48b of the photosensor array 48. The image sharpness gradually degrades as the target dataform 45 is moved from the best focus position inwardly towards a near field cut off distance S1 or away toward a far field cut off distance S3. At the near field and far field cut off distances S1, S3, the target dataform 45 having the specified minimum cell size is still capable of being decoded. However, at distances less than S1 or greater than S3, the imaging assembly 18 will no longer be able to decode the target dataform 45.

The horizontal and vertical angular field of view of optic assembly 43 is 32° horizontal)×24° (vertical). This corresponds to a 40 diagonal field of view. The horizontal angular field of view is shown schematically as an angle labeled with reference number 47 in FIG. 14. Near field and far field cut off distances S1 and S3 are set forth below for a number of different dataform minimum cell sizes. At the S1 and S3 distances, a dataform having the specified minimum cell size can still be decoded by the imaging assembly 18. For a minimum cell size of 15 mil, the S2 best focus working distance is 140 mm. (5.5 in.).

The preferred optic assembly 43 includes four lenses L1, L2, L3, L4 and the plastic spacer member SP1 separating lenses L2 and L3. The lenses L1, L2, L3, L4 and the spacer member SP1 are supported in the inner shroud 57a of the shroud assembly 57. A flat lens L5 is mounted on an upper surface of the photosensor array IC chip 48a and overlies the light receiving surface 48b of the photosensor array 48. Features of the optic assembly 43 of the imaging assembly 18 include:

| | |
|---|---|
| Field of view | 32° (Horizontal) × 24° (Vertical) |
| | 82 mm. (3.2 in.) × 62 mm. (2.4 in.) at |
| | a working distance of 140 mm. (5.5 in.) |
| Minimum decode cell size | 6.6 mil |
| Ambient light | total darkness of full sun light |
| Spectral range | 400–700 nm. |
| Focal length | 8 mm. |
| F-number | 9 |
| Image size | 4.8 mm. (Horizontal) × 3.6 mm. (Vertical) |
| Resolution | MTF > 50% @ 50 cyc/mm |
| Distortion | 1% |

Image size refers to the size of the image projected onto the photosensor array light receiving surface 48b.

The working range of the optic assembly 43 with respect to reading 15 mil. dataforms is as follows:

| Cell size | Min. working distance S1 | Max working distance S3 | Pitch | Skew | Rotation |
|---|---|---|---|---|---|
| 15 mil | 65 mm. (2.5 in.) | 290 mm. (11.5 in.) | 15° | 15° | 360° |

The field of view or target area 44 of the optic assembly 43 at the best focus distance S2 of 140 mm. (5.5 in.) and at the minimum and maximum working distances S1, S3 are as follows:

| Distance | Width | Height |
|---|---|---|
| S1 | 37 mm. (1.5 in.) | 28 mm. (1.1 in.) |
| S2 | 82 mm. (3.2 in.) | 62 mm. (2.4 in.) |
| S3 | 166 mm. (6.5 in.) | 123 mm. (4.9 in.) |

The optic prescriptions for each of the optic surfaces of the optic assembly 43 are as follows:

| Optic Surface | Radius of Surface Curvature | Diameter | Shape |
|---|---|---|---|
| 90 | 10.093 mm. | 7 mm. | Concave |
| 92 | 3.635 mm. | 7 mm. | Concave |
| 94 | 6.995 mm. | 7 mm. | Convex |
| 96 | 5.834 mm. | 7 mm. | Convex |
| 98 (Flat) | Infinity - Pinhole diameter 1.171 mm. | 7 mm. | Flat |
| 100 | 25.116 mm. | 7 mm. | Concave |
| 102 | 5.834 mm. | 7 mm. | Concave |
| 104 | 13.499 mm. | 7 mm. | Convex |
| 106 | 4.325 mm. | 7 mm. | Convex |
| 108 (Flat) | Infinity | 7 mm. | Flat |
| 110 (Flat) | Infinity | 7 mm. | Flat |

The distance between successive optical surfaces 90–110 is as follows:

| Optic Surface | Distance |
|---|---|
| 90–92 | 0.529 mm. |
| 92–94 | 0.609 mm. |
| 94–96 | 2.389 mm. |
| 96–98 | 1.714 mm. |
| 98–100 | 2.114 mm. |
| 100–102 | 0.599 mm. |
| 102–104 | 0.366 mm. |
| 104–106 | 2.482 mm. |
| 106–108 | 7.27 mm. |
| 108–110 | 0.60 mm. |
| 110–Photosensor | 1.31 mm. |

Where "Photosensor" is the light receiving surface 48b of the photosensor array 48. The glass type for each lens L1, L2, L3, L4, L5 of the lens assembly LA is as follows:

| Lens | GLASS TYPE | REFRACTIVE INDEX |
|---|---|---|
| L1 | SF5 Schott | 1.67270 |
| L2 | RAFD13 Hoya | 1.85540 |
| L3 | SF11 Schott | 1.78472 |
| L4 | LAK21 Schott | 1.64050 |
| L5 | BL7 Schott | 1.51289 |

The lenses L1, L3, L4, L5 are available from Schott Glass Technologies, Inc. of Duryea, Pa. The lens L2 is available from Hoya Corp USA, Optics Division located in San Jose, Calif.

Illumination Assembly 42

Because the desired working range and field of view of the portable data collection device 10 dictates that the optic assembly 43 have a large F number (F # 9), the illumination assembly 42 must provide adequate illumination of the target area 44 during the exposure period so that enough reflected light is absorbed by the photosensor array 48 to generate a suitably bright image. However, the exposure period is normally limited to 0.01 seconds or less to minimize the smear effect of an operator's hand jittering during a dataform reading session. Therefore, the illumination assembly 42 must provide adequate illumination to accommodate the large F# and short exposure time.

The printed circuit board assembly 60 includes a plurality of surface mount exposure illumination LEDs 66. A single piece acrylic or polycarbonate lens array 62, preferably fabricated of PMMA (polymethyl methacrylate), is positioned between the printed circuit board assembly 60 and the target area 44 (FIGS. 8 and 9) for directing the illumination from the exposure LEDs 66 towards the target area 44.

The illumination LEDs 66, which are set out in four banks of four LEDs, emit a green color light to illuminate the target area 44. The green color light emitted by the illumination LEDs 66 has a wavelength of 567±20 nanometers (nm). It has been empirically determined that if light having a wavelength of approximately 567±20 nm. is directed through the color filter 49c, the percentage of light transmitted though the magenta, green and cyan filter elements is substantially the uniform or the same, being in a range between approximately 55–65% transmittivity. The transmittivity of 567 nm. wavelength light through the yellow filter elements is somewhat higher, approximately 93%. To minimize distortion of the image projected onto the light emitting surface 48b of the photosensor array 48 due to transmittivity differences between different color filter elements, it is desirable to have the transmittivity of reflected light through the color filter 49c be as uniform as possible for all the color filter elements. Utilizing green illumination LEDs 66 provides near uniform transmittivity for three of the four filter color elements. Suitable green surface mount LEDs are available as Part No. MTSM235K-G from Mark-Tech Corporation of Latham, N.Y.

Figure 10:
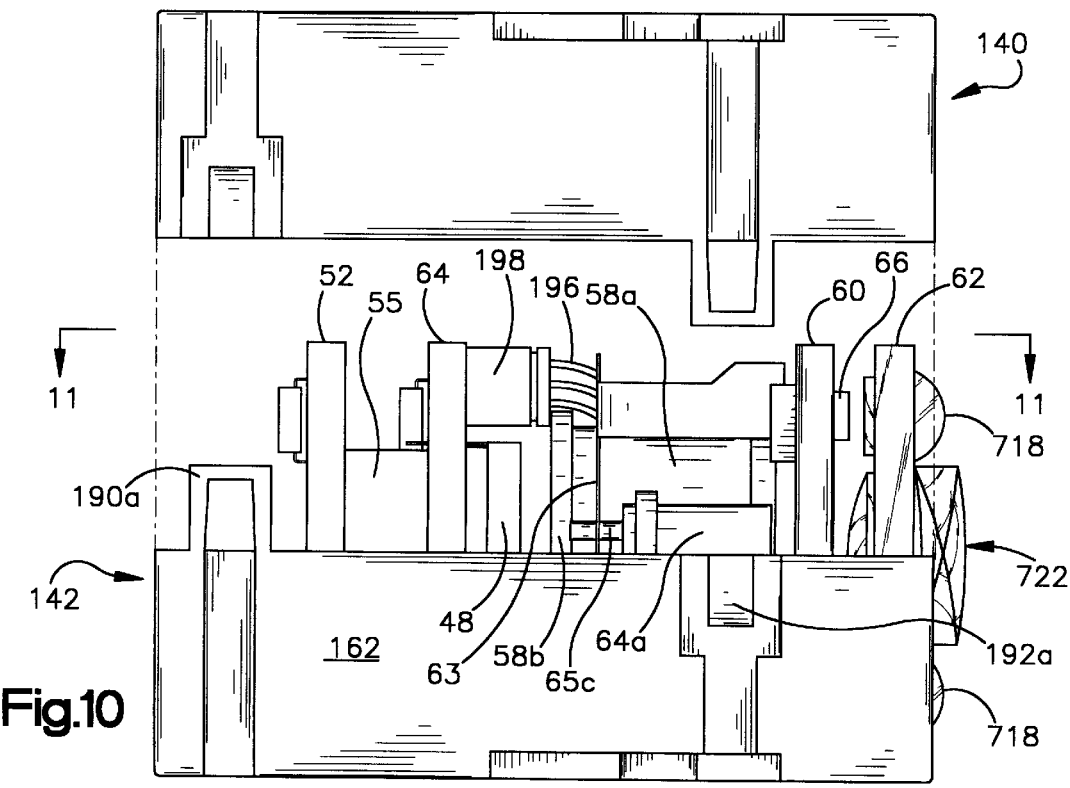
FIG. 10 is a side elevation view of the modular camera assembly of FIG. 8 with an upper half of the housing removed.

As can be seen in FIG. 10 with respect to the previously described lens array 62, the lens array 62 functions as a front panel for the modular portion 20 of the imaging assembly. The printed circuit board assembly 60 includes printed conductors and conductive leads 196 including a power lead operative for supplying power to the illumination LEDs 66. Each illumination LED 66 provides illuminosity of 285 milli candela (mcd) over an angular illumination field of about 68 degrees. The small footprint of each illumination LED 66 enables four LEDs to be placed in a row measuring less than 14 mm. The printed circuit board assembly 60 includes four banks of four illumination LEDs 66 totaling sixteen illumination LEDs providing at least 4560 mcd of uniform illumination over the target area 44 at the best focus distance S2. A central opening 67 in the printed circuit board assembly 60 provides an opening for the shroud assembly 58 to extend through.

The lens array 62 includes four illumination optic portions 708a, 708b, 708c, 708d (FIG. 9 and 18) each of which are aligned with a corresponding bank of illumination LEDs 66. The illumination optic portions 708a, 708b, 708c, 708d direct a 68 degree angular illumination field from each illumination LED 66 into a uniform field having an angular field of view horizontally and vertically which substantially corresponds to the angular field of view horizontally and vertically of the optic assembly 43 which defines the target area 44.

Figure 23:
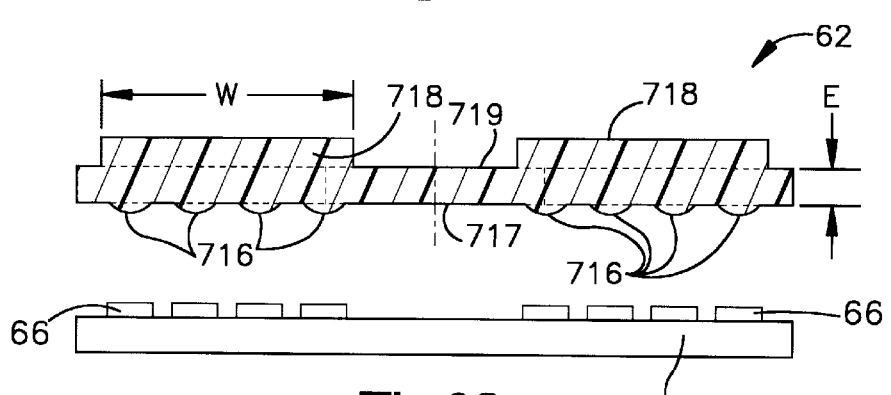
FIG. 23 is a sectional view of the front panel of FIG. 32 as seen from a plane indicated by the line 23—23 in FIG. 21.

Referring to FIGS. 23 and 25, which show a horizontal cross section (FIG. 23) and a vertical cross section (FIG. 25) through the illumination optic portions 708a, 708b, 708c, 708d, it can be seen that each optic portion comprises a lens including four vertically oriented cylindrical entry optic surfaces 716 extending from a back side 717 (FIG. 23) of the lens array 702. One vertically oriented cylindrical entry surface 716 is positioned in front of a corresponding LED 66.

Each optic portion 708a, 708b, 708c, 708d also includes a horizontally oriented cylindrical optic exit surface 718 extending from a front side 719 (FIG. 34) of the lens array 62. One horizontally oriented cylindrical exit optic surface 718 is positioned in front of each bank of four LEDs 66.

Figure 21:
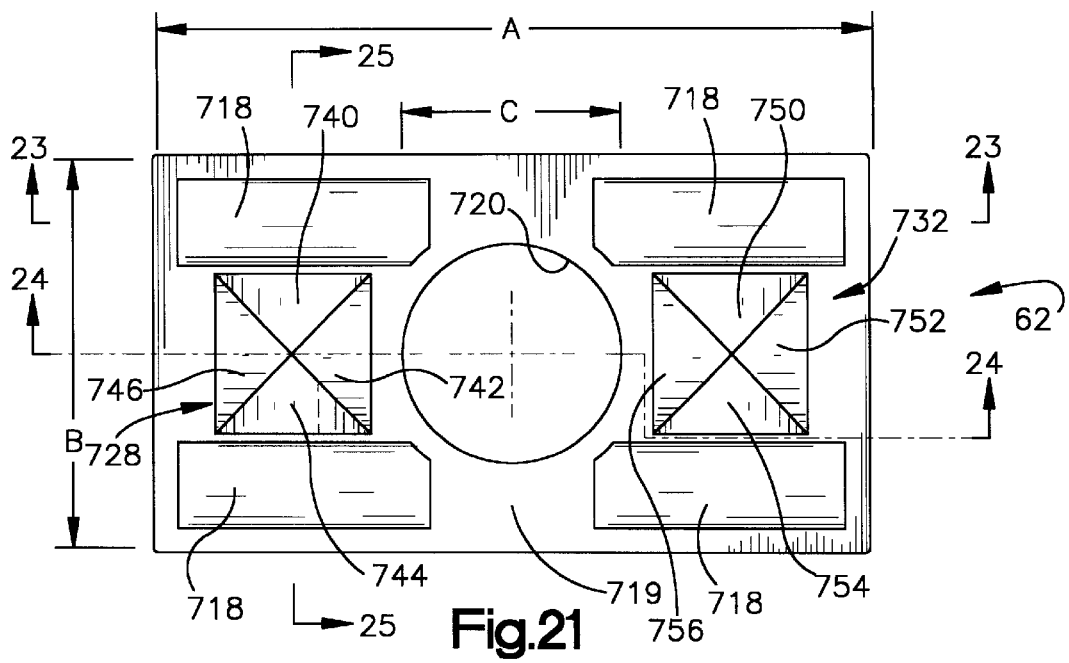
FIG. 21 is a front elevation view of the front panel of FIG. 19.
Figure 22:
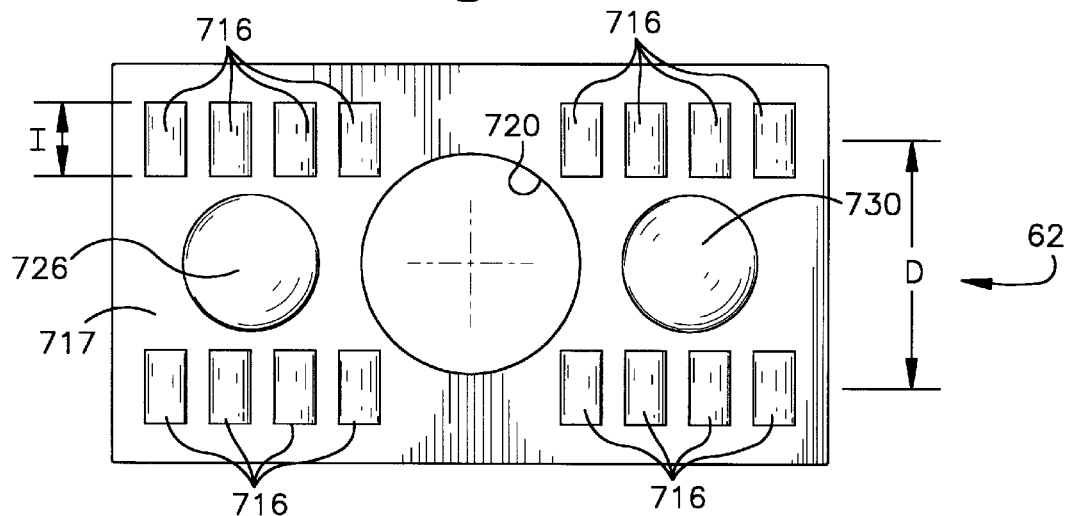
FIG. 22 is a back elevation view of the front panel of FIG. 19.

The vertically oriented cylindrical entry optic surfaces 716 define the horizontal field of illumination and the horizontally oriented cylinders 718 define the vertical field of illumination. This arrangement provides an even illumination intensity distribution across the target area 44. The 4560 mcd of illumination provided by the illumination LEDs 66 will provide an illumination intensity in excess of 106 lux at the far field cut off distance S3 of 290 mm. (11.5 in.) for 15 mil minimum cell size dataforms. The vertically oriented entry surfaces 716 have a radius of curvature of 1.50 mm. and a height I (FIG. 35) of 4.00 mm. while the horizontally oriented exit surfaces 718 have a radius of curvature of 3.0 mm. and a width J (FIG. 36) of 13.75 mm. Referring to FIGS. 21–23, suitable dimensions for the lens array 702 are as follows:

| Label | Description | Dimension |
|-------|-------------|-----------|
| A | Height of lens array 62 | 21.75 mm. |
| B | Width of lens array 62 | 39.55 mm. |
| C | Diameter of center opening 720 of lens array 62 | 12.00 mm. |
| D | Height between middle of vertical entry surfaces 716 | 14.13 mm. |
| E | Thickness of lens array 62 | 1.95 mm. |

Referring again to FIG. 18, the illumination assembly 42 also includes a targeting arrangement or assembly to aid in aiming the device 10 at the target object 45. The targeting assembly includes the targeting LED illuminators 64a, 64b, which extend into apertures 68, 70 in the printed circuit board assembly 60 and, when to energized, project illumination into first and second targeting optics 722, 724 respectively of the lens array 62. The first and second targeting optics 722, 724 are mirror images of each other and are identical in configuration. Each targeting optic generates a crosshair pattern of illumination CR1, CR2 (seen in FIGS. 18 and 26) and, as will be discussed below, if the target object 45 is at a proper distance for imaging, i.e., at the best focus position S2 of the optic assembly 43, the crosshairs CR1, CR2 will coincide or overlap producing a single rectangular crossing or crosshair pattern of illumination CR (FIGS. 18 and 26). The rectangular illumination pattern CR will have a height h of 62 mm. (2.4 in.) and a width w of 82 mm. (3.2 in.) (FIG. 18) at the best focus position S2 (140 mm.). The rectangular illumination pattern CR substantially corresponds to the target area of the optic assembly 43 at the best focus position S2. Of course, the rectangular illumination pattern CR will not be a perfect intersecting line crosshair but rather will be characterized by an illumination intensity distribution or pattern having some visible "thickness" t (FIG. 18), but will nonetheless be suitable for aiming the device 10.

The first and second targeting optics 722, 724, which are identical in configuration, are shown in cross section in FIGS. 24 and 25. The first targeting optics 722 comprises a lens with an aspherical light entry optic surface 726 and a segmented cylindrical light exit optic surface 728. The second targeting optics 724 comprises a lens with an aspherical light entry optic surface 730, similar to the aspherical light entry optic surface 726, and a segmented cylindrical light exit optic surface 732, similar to the segmented cylindrical light exit optic surface 728.

The aspherical entry surfaces 726,730 each have a diameter of 8 mm., a radius of curvature of 2.890 mm. and a conic constant of −2.534. The segmented cylindrical light exit surfaces 728, 732 each have an 8.0 mm. by 8.0 mm. square shaped outer perimeter. The segmented cylindrical surface 728 is comprised of four triangular shaped sections 740, 742, 744, 746 (FIG. 21) while the segmented cylindrical surface 732 is divided into four triangular shaped sections 750, 752, 754, 756, wherein the optic surfaces of sections 740 and 750 are identical, the optic surfaces of sections 742 and 752 are identical, the optic surfaces of sections 744 and 754 are identical and the optic surfaces of sections 746 and 756 are identical.

Upper and lower triangular sections 740, 744 comprise vertically oriented cylindrical light exit optic surfaces. Left and right triangular sections 742, 746 comprise horizontally oriented cylindrical light exit optic surfaces. Similarly, upper and lower triangular sections 750, 754 comprise vertically oriented cylindrical light exit optic surfaces, while left and right triangular sections 752, 756 comprise horizontally oriented cylindrical light exit optic surfaces. The vertically oriented cylindrical optic surfaces 740, 744, 750, 754 have a radius of curvature of 25.00 mm. Similarly, the horizontally oriented cylindrical optic surfaces have a radius of curvature of 25.00 mm.

As can best be seen in FIG. 24, the horizontally and vertically oriented cylindrical optic surfaces 742, 746, 740, 744 are tipped at an angle c with respect to a longitudinal axis L-L though the lens array 62 and, therefore, is also tipped at an angle c with respect to the target area 44. The tip angle c of the horizontally oriented cylindrical optic surfaces 742, 746 shifts the horizontal position of the illumination rectangle or targeting crosshair CR1 (schematically shown in FIG. 18) generated by the first targeting optics 722 such that it is horizontally centered in the target area 44 while the tip angle c of the vertically oriented cylindrical optic surfaces 740, 744 shifts the vertical position of the targeting crosshair CR1 generated by the first targeting optics 722 such that it is vertically centered in the target area 44. A suitable tip angle of c is 9.83 degrees.

Similarly, as can also be seen in FIG. 24, the horizontally and vertically oriented cylindrical optic surfaces 752, 756, 750, 754 are also tipped at an angle c which is preferably 9.83 degrees with respect to a longitudinal axis L-L though the lens array 62. Note that the direction of tilt of the segmented cylindrical light exit surfaces 728, 732 are the same in magnitude but opposite in a direction of tilt, that is, the light exit surface 728 of the first targeting optics 722 slants downwardly to the left toward the front side 719 in FIG. 24, while the light exit surface 732 of the second targeting optics 724 slants downwardly to the right toward the front side 719 in FIG. 37. Also note that the two horizontally oriented light exit optic surfaces 718 which would be seen in FIG. 24 have been removed for clarity of the drawing. It should also be noted that FIG. 20 which shows the segmented cylindrical light exit surface 732 as being comprised of four individual exploded "pieces" is only a representation to provide additional clarity as to the shape and tilt of the four light exiting surfaces 750, 752, 754, 756. The lens array 62 is fabricated as a single piece and the targeting optics 722, 724 and illumination optics 716, 718 are formed in the single piece. The lens optics are not fabricated by "piecing" together individual optics as might be assumed in looking at FIG. 20.

Additional suitable dimensions, labeled on FIG. 24, for the aspheric light entry surfaces 726, 730, the segmented cylindrical light exit surfaces 728, 732 of the lens array 702 are as follows

| Label | Description | Dimension |
|---|---|---|
| F | Maximum extension of aspheric light exit surfaces 726, 730 from back side 717 of lens array | 1.75 mm. |
| G | Distance between maximum extension of aspheric light exit surfaces 726, 730 and center of respective segmented light exit surfaces 728, 732 along centerlines T-T | 5.25 mm. |
| H | Distance between centerlines T-T and outer edge of lens array 62 | 7.80 mm. |

As noted above, the best focus distance S2 is 140 mm. (5.5 in.). If the device 10 is oriented such that the lens array 62 is substantially parallel to a surface of the target object 45 (a dataform to be imaged and decoded) and positioned at the best focus distance S2 from the target object 45, then the targeting crosshairs CR1 and CR2 will coincide and generate the single targeting crosshair CR as shown in FIG. 26 having an approximate height h of 62 mm. (2.4 in.) and an approximate width w of 82 mm. (3.2 in.) which substantially corresponds to the target area 44 height of 62 mm. and width of 82 mm. at the best focus position S2 of 140 mm. (5.5 in.) in front of the optic surface 90 of lens L1.

If the device 10 is moved away from the best focus distance S2 with respect to the target object 45, the targeting crosshairs CR1 and CR2 will separate horizontally as shown in FIG. 27 thereby informing the operator that the distance of the device 10 from the target object 45 is not correct for best imaging or imaging and decoding. Finally, if the lens array 62 is not substantially parallel to a surface of the target object 45, that is, the device 10 is tilted forward or backward from a position where the front surface 717 of the lens array or front panel 62 is parallel to the target object surface, the vertical portions of the illumination patterns of CR1 and CR2 will be angularly to shifted or displaced as shown in FIG. 28, the greater the angle of tilt of the device 10, the greater will be the angular shifting of the vertical portions of the illumination patterns CR1, CR2.

As was noted above, the targeting LEDs 64a, 64b are turned off by the imaging assembly circuitry 18 during capture of an image frame to reduce possible image distortion caused by glare from the targeting LEDs reflecting off the target object 46. In an alternate embodiment, in addition to turning off the targeting LEDs 64a, 64b, the four banks of illumination LEDs 66 may be sequentially energized instead of being simultaneously energized to further reduce glare from the target object 46 in the target area 44 of the optic assembly 43. That is at any given point in time, only one bank of illumination LEDs would be energized. After a short predetermined time period, the presently energized bank would be turned off and another bank would be energized for the predetermined time period. In this manner each bank would be energized sequentially, being energized ½ of the time and off ¾ of the time. Sequential illumination of the four banks of two illumination LEDs 66 will have the effect of reducing the overall level of illumination of the target area 44 while still providing for uniformity in illumination throughout the target area.

In other operating embodiments, the sequence of energization may be varied so that at any point in time more than one LED bank is energized, for example, sequencing of energization of the LED banks could be altered such that two or three banks of LEDs are energized at any given point in time.

Image Processing of the Imaging Assembly 18

Figure 29A:
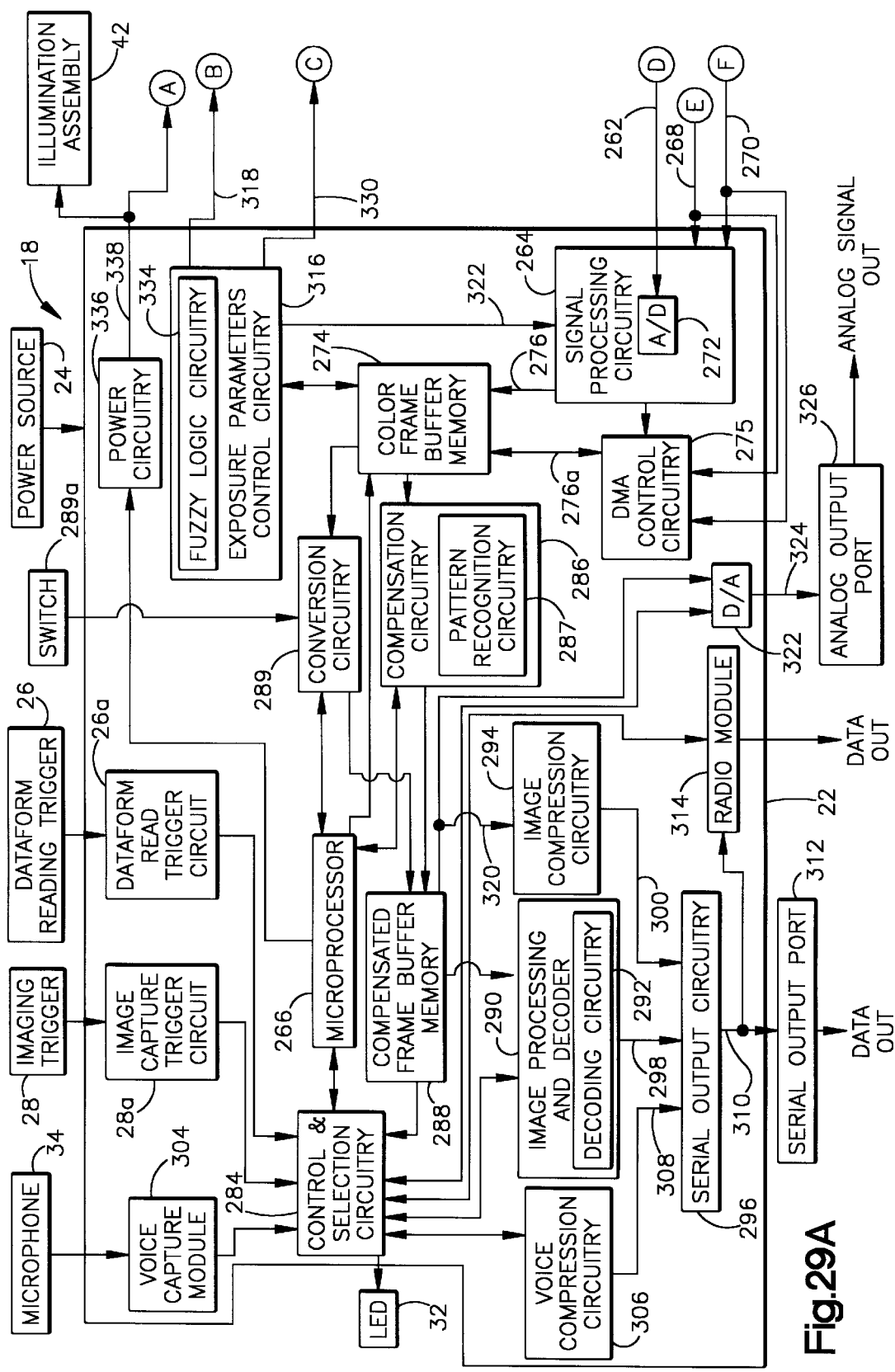
FIG. 29A is one portion of a block diagram of selected circuitry of the portable data collection device of the present invention.
Figure 29B:
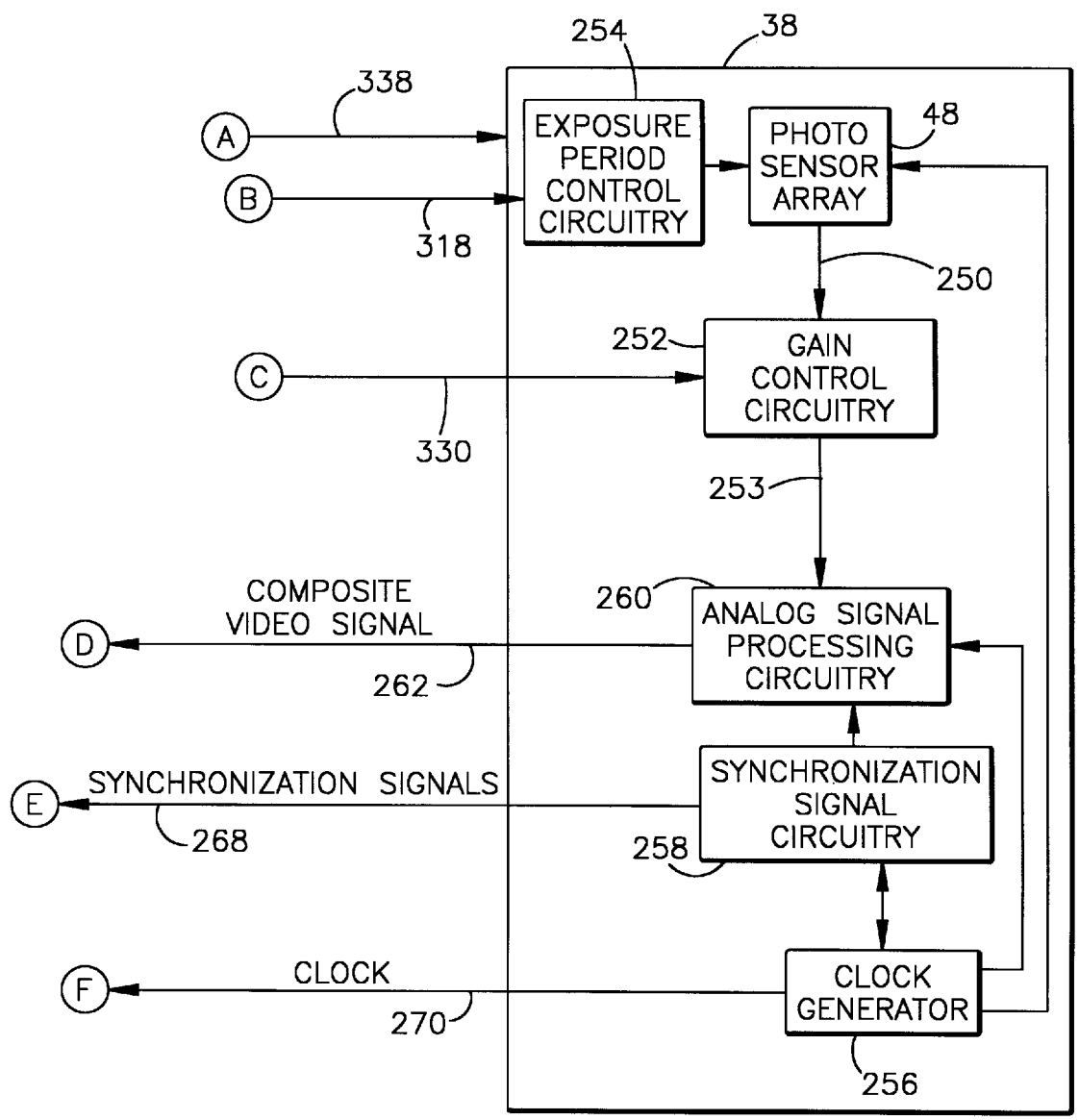
FIG. 29B is a second portion of a block diagram of selected circuitry of the portable data collection device of the present invention, the second portion matching the first portion shown in FIG. 29A.

In the preferred embodiment of the portable data collection device of the present invention, the color 2D photosensor array 48 is part of the board camera assembly 38 commercially available from such Sony of Japan. Referring to FIGS. 29A and 29B, the board camera assembly 38, when activated in either the dataform reading or imaging mode, generates the composite video signal 262. As noted above, except for the color photosensor array 48, the circuitry of the board camera assembly is "black and white" circuitry, which normally is used with a non-color photosensor array. In essence, the board camera assembly 38 has been modified by replacing a non-color photosensor array IC chip with the color photosensor array chip 48a. Since the circuitry of the board camera assembly 38 has not been changed. The resulting output signal of the board camera assembly 38 is not a color Y-C signal that would be generated by a color board camera assembly but rather the composite video signal 262 characteristic of the output signal of a black and white or non-color board camera assembly.

As can be seen schematically in FIG. 29B, the board camera assembly 38 also includes a clock generator 256, synchronization signal circuitry 258 and analog signal processing circuitry 260 for reading illumination intensity values out of each photosensor of the color photosensor array 48 and generating the composite video signal 262.

The intensity of light incident on individual photosensors of the color photosensor array 48 varies somewhat uniformly from very bright (whitest areas of the image of the target area 44) to very dark (darkest areas of the image of the target area 44). The preferred color photosensor array 48 comprises an interlaced 752 by 582 matrix array of photodiode photosensors or image pixels (for a total of 437,664 pixels). The clock generator 256 is coupled to a crystal oscillator and generates asynchronous clocking signals to read out charges accumulating on individual photosensors over an exposure period. The charges on the photosensors are read out through CCD elements adjacent the photosensor array photosensors. The charges are converted to a voltage signal 250 (FIG. 29B) wherein temporal portions of the voltage signal represent the changes accumulated on each photosensor. One CCD element is provided for reading out the charges on two photosensors thus two read outs of the photosensor array 48 comprise one full image flame, the image frame being comprised of two interlaced fields.

The board camera assembly 38 generates the composite analog video signal 262 corresponding to consecutive fields of the image incident on the photosensor array 48. The video signal 262 is termed "composite" because it includes synchronization signals generated by the synchronization signal circuitry 258 which correlate portions of the video signal to particular photosensor locations, interspersed among image signal portions wherein the signal magnitude represents charges on individual photosensors read out from a given row of the photosensor array 48.

The board camera assembly 38 also includes gain control circuitry 252 for controlling amplification of the image signal 253 and exposure period control circuitry 254 for controlling a duration of an exposure period of the photosensors. Both the exposure period control circuitry 254 and the gain control circuitry 252 are controlled by fizzy logic exposure parameter control circuitry discussed with reference to FIG. 29A.

The synchronization signals 268 generated by synchronization signal circuitry 258, the clock signal 270 generated by the clock generator 256, and the composite video signal 262 are output to signal processing circuitry 264 on the control and decoder board 22. Under the control of a microprocessor 266 mounted on the control and decoder board 22, the composite video signal 262 is input to the signal processing circuitry 264 along with the clocking signals 268 and the synchronization signals 270. The signal processing circuitry 264 includes synchronization extractor circuitry which receives the clocking signals 268 and the synchronization signals 270 and generates signals which are coupled to analog to digital converter circuitry (A/D converter circuitry) 272 causing the A/D converter circuitry to periodically digitize the video signal 262. The A/D converter circuitry 272 includes an A/D converter generating an 8 bit gray scale value for each photosensor read out. The 8 bit gray scale illumination value corresponding to a given photosensor is a surrogate measure of the illumination incident on the photosensor over the exposure period prior to the reading out of the photosensor. The magnitude of gray values ranges from 0 (low charge read out from photosensor corresponding to a low illumination level incident on photosensor over the exposure period) to 127 (high charge read out from photosensor corresponding to a high illumination level incident on photosensor over the exposure period).

Direct memory access (DMA) control circuitry 275 receives the synchronization signals 270 and clock signals 268 and generates address signals 276a coupled to the frame buffer memory 274 to indicate a storage location for each value generated by the A/D converter circuitry 272. Data signals 276 representing the gray scale values generated by the A/D converter circuitry 272 are coupled to the frame buffer memory 274.

Control and selection circuitry 284 mounted on the control and decoder board 22 and coupled to the frame buffer memory 274 receives successive image frames temporarily stored in the frame buffer memory 274. Also coupled to the control and selection circuitry 284 are the dataform read trigger circuit 26a which, in turn, is coupled to the dataform reading trigger 26 and an image capture trigger circuit 28a which, in turn, is coupled to the imaging trigger 28.

Dataform Reading Mode

When an operator institutes a dataform reading session (dataform reading mode) by depressing the dataform reading trigger 26, the dataform read trigger circuit 26a sends a signal to the control and selection circuitry 284 causing the control and selection circuitry to actuate compensation circuitry 286 and image processing and decoder circuitry 290 to adjust the magnitudes of selected gray scale values stored in the frame buffer memory 274 and decode the adjusted selected gray scale values.

Compensation of Selected Gray Scale Values Prior to Cell Extraction and Decoding If an imaged dataform represented in a captured image frame is to be decoded, at least a portion of the illumination data values stored in the frame buffer memory 274 must be modified to compensate for the differing transmittivity of the filter elements of the color filter 48c. Transmittivity is defined as the ratio of transmitted radiation to radiation arriving perpendicular to a boundary between two media. As noted above, the illumination assembly 42 utilizes green illumination LEDs which generate a wavelength of light having substantially uniform transmittivity for the green, magenta, and cyan filter elements. However, it should be appreciated that the illumination incident on the light receiving surface 48b of the photosensor array 48 includes ambient illumination in addition to the green light reflected from the target dataform 45. Therefore, it is necessary to compensate for the differences in transmittivity at wavelengths other than 567±20 nm.

Compensation circuitry 286, mounted on the control and decoder board and operating under the control of the microprocessor 266, is provided to compensate or adjust some or all of gray scale values to improve the decodability of the imaged representation of the target dataform 45. Preferably, the compensation circuitry 286 includes pattern recognition circuitry 287 that identifies a subset of gray scale values from the set of gray scale values corresponding to a captured image frame that represent an image of a captured dataform within the image of the larger target area 45. The portion of a captured image frame corresponding to the imaged dataform will typically include only two colors, black and white. The black corresponds to black or dark colored bars or areas interspersed in a light colored background. The pattern recognition circuitry 287 scans the gray scale values in the frame buffer memory 274 and identifies patterns of high and low gray scale values which would corresponding to the characteristic black and white pattern representative of a dataform. By utilizing pattern recognition circuitry 287 and limiting the compensation operation to the image area corresponding to the imaged target dataform, colored portions in the captured image other than the imaged target dataform, distortion from these colored areas which would otherwise hinder decoding is avoided.

If such pattern recognition circuitry 287 is provided, the compensation of gray scale values is applied only to the subset of gray scale values corresponding to the imaged target dataform. If such pattern recognition circuitry 287 is not provided, the compensation circuitry 286 operates on the set of gray scale values corresponding to the entire set of gray scale values. In either event, decodability of the imaged dataform will be improved by application of a compensation method by the compensation circuitry.

The compensation circuitry 286 operates on the gray scale values stored in the frame buffer memory 274 to adjust the magnitudes of selected gray scale values. For ease of explanation, the term "selected gray scale values" will be used. If pattern recognition circuitry 287 is provided, it should be understood that the gray scale values operated on by the compensation circuitry 266 include only those gray scale values corresponding to portions of the imaged target area 44 including the imaged target dataform 45 of the captured image frame. If pattern recognition circuitry 287 is not provided then the compensation circuitry 266 operates on all gray scale values of the captured image frame. Two methods or processes are provided below that may be executed by the compensation circuitry 286 to compensate for the transmittivity differences of the color filter elements of the color filter 48c.

First compensation method

In a first preferred compensation method, the average gray scale illumination value of each color of color filter element is computed for all selected gray scale values. Magnitudes of the gray scale values are then adjusted such that the average gray scale values for each color filter element are equal.

Mathematically, an average magnitude for gray scale values for each color filter element (magenta, green, yellow and cyan) is calculated:

$$AGS(M)=[GS(M1)+GS(M2)+GS(M3)+ \ldots +GS(Mx)]/Mx$$

$$AGS(G)=[GS(G1)+GS(G2)+GS(G3)+ \ldots +GS(Gx)]/Gx$$

$$AGS(Y)=[GS(Y1)+GS(Y2)+GS(Y3)+ \ldots +GS(Yx)]/Yx$$

$$AGS(C)=[GS(C1)+GS(C2)+GS(C3)+ \ldots +GS(Cx)]/Cx$$

where:

AGS(M)=Average magnitude of gray scale values overlaid by a magenta colored color filter element AGS(G)=Average magnitude of gray scale values overlaid by a green colored color filter element AGS(Y)=Average magnitude of gray scale values overlaid by yellow colored color filter elemement AGS(G)=Average magnitude of gray scale values overlaid by a cyan colored color filter element Mx=Total number of gray scale values overlaid by magenta colored color filter element Gx=Total number of gray scale values overlaid by a green colored color filter element Yx=Total number of gray scale values overlaid by a yellow colored color filter element Cx=Total number of gray scale values overlaid by a cyan colored color filter element The grand average of gray scale value magnitudes, AGS. would be given by the sum of the magnitudes of each of the selected gray scale values divide by the total number of selected gray scale values, TOS, TGS=Mx+Gx+Yx+Cx. The formula for AGS is:

$$AGS=[GS(M1)+GS(M2)+ \ldots +GS(Cx-1)+GS(Cx)]/TGS$$

To adjust the magnitude of each gray scale value overlaid by a magenta color filter element, each magenta gray scale value would be multiplied by the ratio AGS/AGS(M). For example, if the grand average of all selected gray scale value magnitudes, AGS, was 60 and the average gray scale value magnitude for gray scale values corresponding to photosensors overlaid by magenta color filter elements, AGS(M) was 50, and further if a given gray scale value, GS(M1), in the set of gray scale values corresponding to photosensors overlaid by magenta color filter elements was 70, then the adjusted or compensated gray scale value magnitude for GS(M1) would be:

$$\text{Adjusted } GS(M1)=GS(M1)\times[AGS/AGS(M)]$$

=70×[60/50]
=70×1.2
=84

Similarly, to adjust the magnitude of each gray scale value overlaid by a green color filter element, each green gray scale value would be multiplied by the ratio AGS/AGS(G). To adjust the magnitude of each gray scale value overlaid by a yellow color filter element, each yellow gray scale value would be multiplied by the ratio AGS/AGS(Y). Finally, to adjust the magnitude of each gray scale value overlaid by a cyan color filter element, each cyan gray scale value would be multiplied by the ratio AGS/AGS(C).

The set of adjusted or compensated gray scale value magnitudes (transmission of signal representing the compensated gray scale value magnitudes are shown schematically by arrow 286a in FIG. 29A) is stored in a compensated frame buffer memory 288 and subsequently extracted and decoded by the image processing and decoder circuitry 290 as will be explained below. The matrix of compensated gray values in then subjected to cell extraction and decoding as will be explained below. Although the adjusted gray scale value magnitudes 286a are stored in the compensated frame buffer memory 288, it should be appreciated that a single frame buffer memory may be utilize in place of the frame buffer memory 274 and the compensated frame buffer memory 288. Additionally, the compensated gray scale values 289b, when calculated, may be written in the same memory locations in the single frame buffer memory as the original gray scale value magnitudes, thereby overwriting the original gray scale value magnitudes.

Second compensation method

A second preferred compensation method is based upon recognizing that any 2×2 (2 by 2) grouping of four photosensors necessary includes one photosensor overlaid by a green color filter element of the color filter 48c, one photosensor overlaid by a magenta color filter element, one photosensor overlaid by a yellow color filter element, and one photosensor overlaid by a cyan color filter element. Therefore, averaging the gray scale value magnitudes for each permutation of 2×2 photosensor grouping will yield a matrix or set of normalized gray scale value magnitudes. If no pattern recognition circuitry 287 is employed to reduce the number of gray scale values selected, the number of permutations of 2×2 photosensor groupings will generate (752-1)×(582-1)=436,331 normalized gray scale value magnitudes being generated.

The formula for calculating a normalized gray scale value magnitude, NGS(x,y), for the xth horizontal and the yth vertical photosensor grouping is as follows:

$$NGS(x, y) = \frac{GS(x, y) + GS(x+1, y) + GS(x, y+1) + GS(x+1, y+1)}{4}$$

where:

NGS(x,y)=normalized gray scale value magnitude for gray scale values corresponding to photosensors P(x,y), P(x+1,y), P(x,y+1), and P(x+1,y+1)

GS(x,y)=gray scale value magnitude corresponding to photosensor P(x,y)

GS(x+1,y)=gray scale value magnitude corresponding to photosensor P(x+1,y)

GS(x,y+1)=gray scale value magnitude corresponding to photosensor P(x,y+1) GS(x+1,y+1)=gray scale value magnitude corresponding to photosensor P(x+1,y+1)

The set or matrix of normalized gray scale values corresponds to a set of compensated or adjusted gray scale values 286a. The set of compensated gray scale values 286a is then stored in the compensated frame buffer memory 288 and subsequently extracted and decoded by the image processing and decoder circuitry 290 as will be explained below. This compensation method reduces signal modulation for high spatial frequency codes (small black and white areas).

Cell extraction and Decoding

The image processing and decoding circuitry 290 includes a decoder 292 for decoding 1D and 2D dataforms in the target area 44. The image processing and decoder circuitry 290 operates on the stored frame of image data to extract dataform cell data (determine the black or white value of each cell of the dataform) and decode the cell data. Cell extraction is done in accordance with U.S. patent application Ser. No. 08/543,122 entitled, "Sub Pixel Dataform Reader With Dynamic Noise Margins", filed Oct. 13, 1995 and assigned to the assignee of the present invention. The contents of application Ser. No. 08/543,122 is hereby incorporated by reference. Decoding of the cell data is accomplished by known decoding methods for each particular dataform format.

Also coupled to the control and selection circuitry 284 is image compression circuitry 294 and serial output circuitry 296. The control and selection circuitry 284 routes data 298 representing a decoded dataform data directly from the decoding circuitry 292 to the serial output circuitry 296. The decoded dataform data 298 is not compressed prior to output to the serial output circuitry 296. There is a possibility of error in the compression and subsequent decompression process and losing even a portion of a decoded dataform data may result in adverse consequences such as subsequent errors in updating inventory, determining the status or tracking an item, etc. Thus, the decoded dataform data 298 is not compressed.

Imaging Mode

When an operator institutes an imaging session (imaging mode) by depressing the imaging trigger 28, the image capture trigger circuit 28a sends a signal to the control and selection circuitry 284 causing the selection circuitry to actuate conversion circuitry 289 to convert the gray scale values corresponding to one or more captured image frames into either Y-C or RGB color digital data (signals representing the digital data are shown schematically by arrow 320 in FIG. 29A) and store the data 320 in the compensated frame buffer memory 288. The digital data 320 is extracted from the compensated frame buffer memory 288 and compressed by image compression circuitry 294. The compressed digital data 300 is further processed by serial output circuitry 296 and made available as compressed digital data 310 through the serial output port 312 and/or a radio module 314. The digital data 320 is also input to a digital to analog converter (D/A converter) 322 where it is converted to an analog Y-C or RGB signal 324 and made available as an analog output signal through an analog output port 326.

The image compression circuitry 294 is provided for efficiency in data transmission and because the occurrence of one or more errors in the color image digital data 320 representing an captured image frame is normally not a significant problem. That is, an image of an item in the target area 44 will still be recognizable and useful to supervisory personnel viewing the image reconstructed from the captured image frame data even if there is some slight distortion of the image. After compression of the color image digital data 320 by the image compression circuitry 294, compressed image data 300 is routed to the serial output circuitry 296. If, however, a high resolution image is needed, the control and selection circuitry 284 may be appropriately programmed to route the data representing the captured frame directly to the serial output circuitry 296 and the radio module 314.

The image compression circuitry 294 utilizes an image compression algorithm to reduce the size of a set of digital image data. One such algorithm is the 2D wavelet transform compression algorithm as described in "A 64Kb/s Video Code Using the 2D Wavelet Transform" by A. S. Lewis and G. Knowles, published in IEEE Computer Society Press, Order No. 2202. The HARC Wavelet Transform System utilizing such technology is available from Houston Advance Research Center in Houston, Tex. and is capable of compressing photographic data with an image compression ratio of up to 400:1.

Because the portable data collection device 10 is adapted for use in remote onsite locations for reading a dataform identifying a particular item or capturing an image of an item, it is desirable to enable the imaging assembly 18 to also capture a verbal message from the operator. The control and decoder board 22 also includes a voice capture module 304 for capturing and digitizing an operator's verbal message and voice compression circuitry 306 for compressing the captured verbal message. The voice capture module 304 is coupled to the microphone 34 and is operable by the control and selection circuitry 284 to capture and digitize audio input. The voice compression circuitry 306 compresses a digitized voice signa. Data 308 representing the compressed digitized voice signal is coupled to the serial output circuitry 296.

For a predetermined period of time after either the dataform reading trigger 36 is depressed to initiate a dataform reading session (dataform reading mode) or the imaging trigger 28 is depressed to initiate a image capture session (imaging mode), the control and selection circuitry 284 monitors the image capture trigger switch 28. If the operator depresses the trigger 28 during the predetermined period, the voice capture module 304 and voice compression circuitry 306 are activated for verbal input. As long as the operator keeps the trigger depressed, the voice capture module 304 and voice compression circuitry 306 will remain activated so that the operator can speak into the microphone 34 and provide information concerning an item whose image was captured or whose dataform was read which will be transmitted and/or stored with the corresponding image or decoded dataform. Normally, the voice capture module 304 will be used subsequent to an imaging session where the operator wants to communicate to supervisory personnel reviewing the captured image some additional information concerning the imaged item such as the item's location, a short description of the problem with the item, etc. The voice compression circuitry 306 utilizes one of a number voice compression algorithms well known to those skilled in the art.

Decoded dataform data 298, compressed image data 300 and compressed digitized voice data 308 are routed to the serial output circuitry 296 which assembles output data 310 for serial output through the serial output port 312 or the radio module 314. In portable data collection device 10, the serial output port 312 is coupled to an input port of a radio module 314 mounted on the control and decoder board 22 (shown schematically in FIG. 14). The radio module 314 modulates and transmits the output data 310 to a remote device (not shown) where the transmitted data is demodulated. The demodulated output data may be used to update inventory, and/or accounting records, update production control expediting or product tracking files, permit supervisory corrective action to remove/repair damaged items, etc. The control and decoder board 22 further includes exposure parameters control circuitry 316 which outputs control signals 318, 330 to the exposure period control circuitry 254 and the gain control circuitry 252 of the camera assembly 38 and a signal 322 embodying an appropriate set of reference voltages for operating the A/D converter 272. The exposure parameters control circuitry 316 includes fuzzy logic circuitry 334 which analyzes captured frames of data accessed from the frame buffer memory 274. The fuzzy logic circuitry 334 analyzes a captured frame to determines if the current exposure period of the 2D photosensor array 48, the current amplification of the video signal 250 by the gain control circuitry 252 and the reference voltages used by the A/D converter circuitry 272 are resulting in an "acceptable" captured image frame. If not, the control signal 318 is changed to adjust the exposure period of the 2D photosensor array 48 and/or the control signal 330 is changed to adjust the amplification of the video signal 250 and/or the signal 322 is changed to adjust the operation of the A/D converter circuitry 272. After the adjustment, another captured frame is analyzed by the fuzzy logic circuitry 334 and, if necessary, further adjustments are made in an iterative fashion until the camera assembly 32 produces an "acceptable" captured image. A suitable exposure parameter control circuit including fuzzy logic control circuitry is disclosed in U.S. patent application Ser. No. 08/544,618, filed Oct. 18, 1995, entitled "Extended Working Range Dataform Reader Including Fuzzy Logic Image Control Circuitry." The contents of U.S. Ser. No. 08/544,618 are incorporated in its entirety by reference.

As can be seen in FIGS. 14 and 29A, the power source 24 is coupled to the control and decoder board 22 to provide operating power to the microprocessor 266 and other circuitry mounted on the board and the radio module 314.

Power circuitry 336 under the control of the microprocessor 266 is coupled through a lead 338 to the illumination assembly 42 and the board camera assembly 38 to supply power to these components of the imaging assembly 18.

Conversion of Gray Scale Values to Color Image Data

When the imaging assembly 18 is operating in the imaging mode, it may be desirable to generate a Y-C signal which is coupled to, for example, a television to generate a color image of a captured image frame or successive captured image frames. At other times, when the imaging assembly 18 is operating in the imaging mode, it may be desirable to generate a RGB (red, blue, green) signal which is coupled to, for example, a VGA monitor to generate a color image of a captured image frame or successive captured image frames. Conversion circuitry 289, operating under the control of the microprocessor 266, provides for the conversion of the gray scale values extracted from the frame buffer memory 274 to a color image digital data values 320 (either Y-C or RGB digital data) which are stored in the compensated frame buffer memory 288.

Y-C Color Digital Data Conversion

If a Y-C color signal is needed for output to, for example, a television, the conversion circuitry 289, the two position switch 289*a* will moved to a first position causing the conversion circuitry will generate digital data representing components of a Y-C signal corresponding to one or more captured image frames. Recall that a set of unadjusted gray scale values associated with a captured image frame are stored in the frame buffer memory 274. To convert the gray scale values to Y-C color digital data 320, the set of unadjusted gray scale values is read or "virtually scanned" in an interlaced pattern in the frame buffer memory 274 to emulate the reading out of the photosensor array 48. The read out unadjusted gray scale values are used to generate a set of digital data 320 representing a Y-C signal for the captured image frame which is stored in the compensated frame buffer memory 288. The Y-C color digital data 320 is then extracted from the compensated frame buffer memory 288 and is coupled to the image compression circuitry 294 and is also coupled to the D/A converter 322. The D/A converter 322 converts the Y-C color digital data 320 into the analog Y-C signal 324 which is made available through the analog output port 326. The Y-C color digital data 320 is also compressed by the image compression circuitry 294 to generate compressed Y-C color digital data 300. The data 300 is further processed by the serial output circuitry 296 generating Y-C color digital data 310 which is made available through the serial output port 312 and/or the radio module 314.

The Y-C analog signal 324 consists of "Y", the luminance (brightness) signal value and two color difference values "R-Y" (red-yellow) and "B-Y" (blue-yellow). The formula for calculating the Y, R-Y and B-Y component digital data values 320 from a group or set of four gray scale illumination values corresponding) to a 2×2 matrix of photosensors is as follows:

$$Y=[GS(Mg)+GS(Ye)]+[GS(Gr)+GS(Cy)]$$

$$R\text{-}Y=[GS(Mg)+GS(Ye)]-[GS(Gr)+GS(Cy)]$$

$$B\text{-}Y=[GS(Cy)+GS(Mg)]-[GS(Gr)+GS(Ye)]$$

where:
Y=Luminance signal value
R-Y=Red-Yellow difference value
B-Y=Blue-Yellow difference value
GS(g)=Gray scale value magnitude corresponding to photosensor overlaid by a magenta color filter element
GS(Ye)=Gray scale value magnitude corresponding to photosensor overlaid by a yellow color filter element
GS(Gr)=Gray scale value magnitude corresponding to photosensor overlaid by a green color filter element
GS(Cy)=Gray scale value magnitude corresponding to photosensor overlaid by cyan color filter element As noted in the second compensation method discussed above, the number of permutations of 2×2 photosensor groupings generates (752−1)×(582−1)=436,331 sets of Y, R-Y, B-Y component values for the preferred 752×582 photosensor array 48.

RGB Color Digital Data Conversion

If an RGB color signal is needed for output to, for example, a VGA (video graphics array) monitor, the two position switch 289*a* will be moved to its second position causing the conversion circuitry 289 to generate digital data representing components of an RGB signal corresponding to one or more captured image frames. To convert the original or unadjusted gray scale values in the frame buffer memory 274 corresponding a captured image frame to RGB color digital data 320, the set of unadjusted gray scale values is read or "virtually scanned" in an interlaced pattern in the frame buffer memory 274 to emulate the reading out of the photosensor array 48. The read out unadjusted gray scale values are used to generate a set of digital data data 320 representing an RGB signal for the captured image frame which is stored in the compensated frame buffer memory 288. The RGB color digital data 320 is then extracted from the compensated frame buffer memory 288 and is coupled to the image compression circuitry 294 and is also coupled to the D/A converter 322. The D/A converter 322 converts the RGB color digital data 320 into the analog RGB signal 324 which is made available through the analog output port 326. The RGB color digital data 320 is also coupled to the image compression circuitry 294 for compression generating compressed RGB color digital data 300. The data 300 is further processed by the serial output circuitry 296 generating compressed RGB color digital data 310 which is made available through the serial output port 312 and/or the radio module 314.

The formula for calculating the red (R), green (G), and blue (B) component digital data values from a group or set of four gray scale illumination values corresponding to a 2×2 matrix of photosensors is as follows:

$$R=[GS(Mg)+GS(Ye)]-[a\times[GS(Gr)+GS(Cy)]]$$

$$B=[GS(Cy)+GS(Mg)]-[b\times[(GS(Ye)+GS(Gr)]]$$

$$G=[(GS(Mg)+[3\times GS(Gr)]]-[c\times[(GS(Cy)+GS(Ye)]]$$

where:
R=Red component value (8 bit)
B=Blue component value (8 bit)
G=Green component value (8 bit)
GS(Mg)=Gray scale value magnitude corresponding to a photosensor overlaid by a magenta color filter element
GS(Ye)=Gray scale value magnitude corresponding to photosensor overlaid by a yellow color filter element
GS(Gr)=Gray scale value magnitude corresponding to photosensor overlaid by a green color filter element
GS(Cy)=Gray scale value magnitude corresponding to photosensor overlaid by a cyan color filter element As was seen in the second compensation method discussed above, the number of permutations of 2×2 photosensor groupings generates (752−1)×(582−1)=436,331 sets of RGB component values for the preferred 752×582 photosensor array 48. In this formula, a, b, and c are empirically derived based on the transmittivity of the filter colors, the spectral response of the photosensor array, the linearity of the gain circuitry and other values based on characteristics of the actual photosensor array. The calculated values yield three 8 bit component values that make up the 24-bit color RGB value corresponding to the SVGA standard. The values of a, b and c may be determined empirically, however, typical values would be a=0.71, b=0.66, c=0.90.

Operation of Imaging Assembly 18 in Dataform Reading and Imaging Modes

Figure 31:
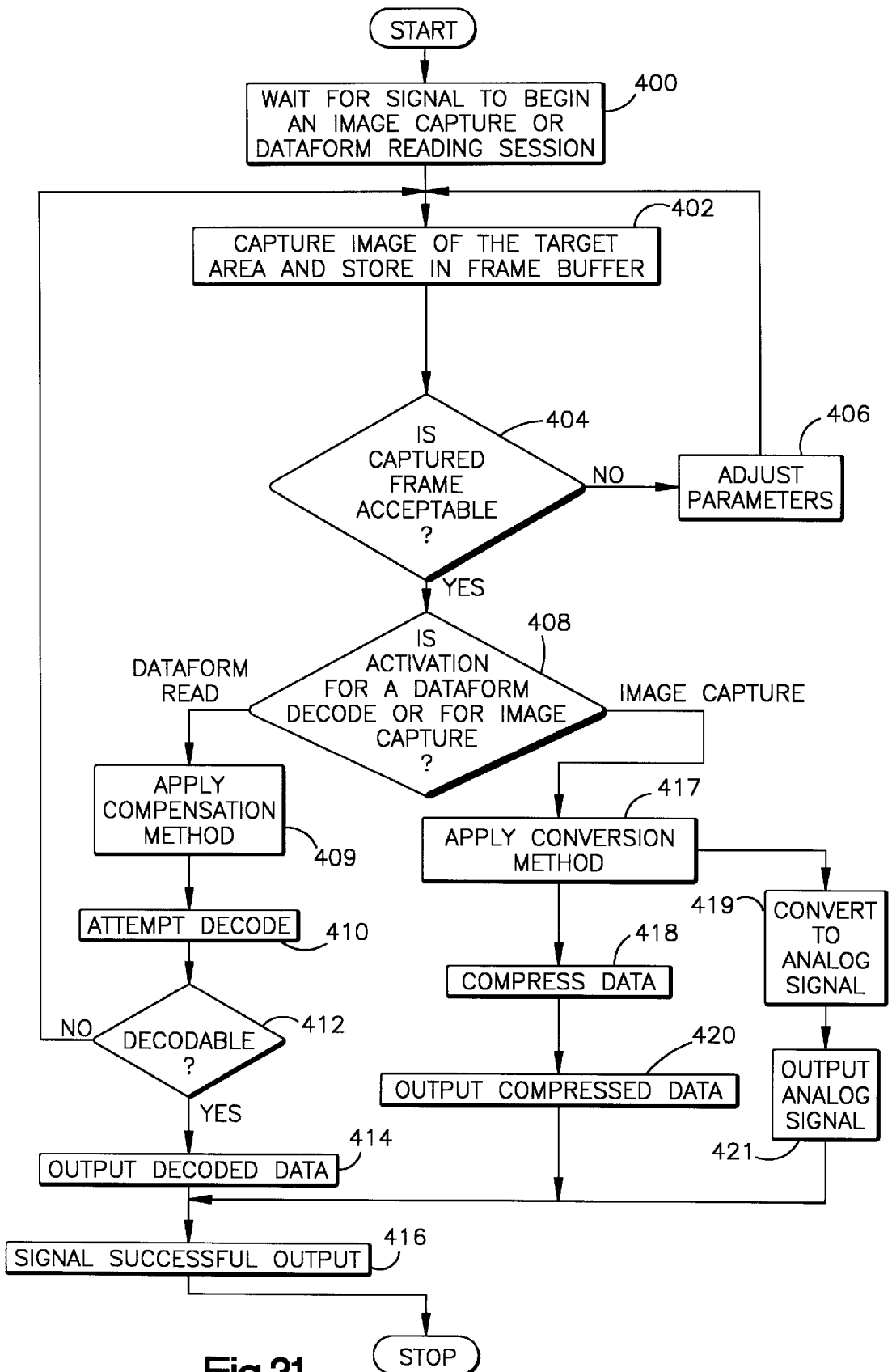
FIG. 31 is a flow chart setting forth one operating embodiment of the portable data collection device of the present invention to decode a bar code dataform and capture an image of a target area.
Figure 32:
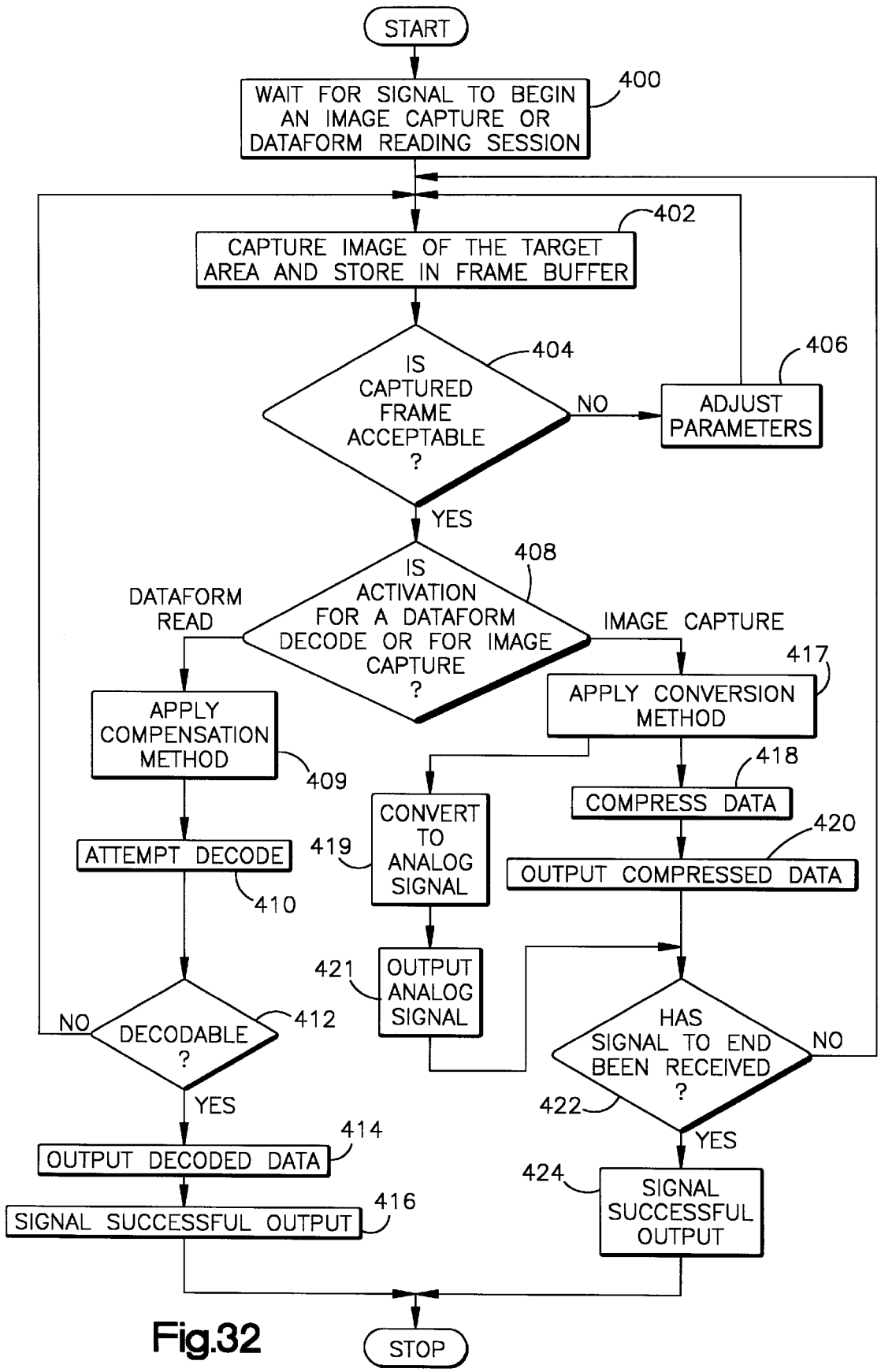
FIG. 32 is a flow chart setting forth a second operating embodiment of the portable data collection device of the present invention to decode a bar code dataform and capture an image of a target area.

The flow chart shown in FIG. 31 illustrates the operation of the imaging assembly 18 in the dataform decoding mode and a first operating embodiment of the imaging mode. In the first operating embodiment of the imaging mode, a single frame of the image in the target area 44 is captured, compressed and output when the operator depressed the imaging trigger 28. The flow chart shown in FIG. 32 illustrates the operation of the imaging assembly 18 in the dataform decoding mode and a second operating embodiment of the imaging mode. In the second operating embodiment of the imaging mode, successive frames of the image in the target area 44 are captured, compressed and output as long as the operator has the imaging trigger 28 depressed.

The imaging mode is advantageously employed when the operator using the portable data collection device 10 notices the item 46 is damaged, out of place, incomplete, etc. The imaging mode of the imaging assembly 18 is used to capture an image of the item 46 and, using the radio module 314, transmit the captured image to a remote device accessible by supervisory personnel so that the problem may be ascertained by supervisory personnel and appropriate corrective action taken, e.g., deletion of item from inventory records, issuance of order to remove item from storage location and return to production facility or vendor for rework/repair, moving item to proper location, filing insurance claim, etc.

Turning to the first operating embodiment of the imaging mode shown in FIG. 31, at 400 the imaging assembly 18 waits for a signal representing either actuation of the imaging trigger 28 or the dataform reading trigger 26 to commence either an image capture session or a dataform reading session. The signal may be generated by the image capture trigger circuit 28a, the dataform reading trigger circuit 26a or by a signal generated by customer specific application software. At 402, upon receiving an appropriate signal, the imaging assembly 18 is activated and a frame of image data captured and stored in the frame buffer memory 274.

At 404, the fuzzy logic circuitry 334 determines if the captured image frame is acceptable, that is, the image is within predetermined acceptable ranges for brightness and the magnitude of charges on the photosensors of the 2D photosensor array 48. If the fuzzy logic circuitry 334 determines the captured frame is not acceptable, one or more of the operating parameters of the board camera assembly 38 and the A/D converter circuitry 272 are modified as shown at step 406. The loop represented by steps 402, 404, 406 are repeated until the captured frame is determined to be acceptable.

At step 408, if the control and selection circuitry 284 determines that the activation signal is from the dataform reading trigger 26 requiring a dataform decode, at step 409 the gray scale values representing the imaged dataform in the target area 44 are adjusted or compensated by the compensation circuitry 286 as explained above. The adjusted or compensated gray scale values are stored in the compensated frame buffer memory 288. At step 410, the image processing and decoder circuitry 290 operates on the compensated gray scale values to reconstruct the image of the dataform via cell extraction and the decoding circuitry 292 attempts to decode the reconstructed dataform image. At step 412, a determination is made if the decoding was successful. At step 414, if the decoding was successful, the extracted decoded data is output to the serial output circuitry 296 and at step 416, the orange color of the LED indicator 32 is energized for a predetermined time to signal the operator that the dataform 45 in the target area 44 has been successfully read. Subsequently, the imaging assembly 18 is turned off.

If at step 412, the decoding was not successful, the process returns to step 402 where another image flame is capture and the remaining steps are repeated. If at step 408, the control and selection circuitry 284 determines that the activation signal is from the imaging trigger 28, at step 417, the gray scale values corresponding to the captured image frame are subject to the either Y-C or RGB conversion by the conversion circuitry 289 as explained above. The choice of Y-C or RGB conversion is selected by the operator using the two position switch 289a to choose between generating Y-C color image data or RGB color image data. The digital Y-C or RGB data resulting from the conversion is stored in the compensated frame buffer memory 290. The digital Y-C or RGB data stored in the compensated frame buffer memory 290 is operated on by the image compression circuitry 294 to compress the digital Y-C or RGB digital data corresponding to the captured frame, as shown at step 418. At step 420, the compressed Y-C or RGB image data is made available for output through the serial output port 312 and/or the radio module 314. At the same time, as shown in step 419, uncompressed Y-C or RGB image data is routed to the D/A converter 322 and converted to the Y-C or RGB analog signal 324. At step 421, the analog signal 324 is made available at the analog output port 326. The LED indicator 32 is energized to display the color orange to signal the operator that the image in the target area 44 has been successfully captured.

Referring to FIG. 32, in a second operating embodiment of the imaging mode, successive frames of an image of the target area 44 are captured for as long as the operator maintains the imaging trigger 28 depressed. This operating embodiment would be advantageous in situations where the item 46 which the operator wishes to image because of some defect, damage, etc., is very large compared to the area of the target area 44. Therefore, capturing a single image frame and transmitting a signal corresponding to the captured frame to a remote device or supervisory review may not provide supervisory personnel with an image covering a large enough portion of the item 46 to ascertain the problem and determine appropriate corrective action. By capturing successive frames during the period that the operator keeps the imaging trigger 28 depressed, the operator may move the portable data collection device 10 with respect to the item 46 to provide a video image of the complete item (or an image of as much of the item as necessary to provide for identification of the item and the item's problem).

For this embodiment, the process remains generally the same as the embodiment described in connection with FIG. 31. However, as long as the imaging trigger 28 remains depressed frame after frame of compressed Y-C or RGB digital data is routed to the serial output port 312 and/or the radio module 314, as shown at steps 418 and 420. At the same time, uncompressed Y-C or RGB digital image data is routed to the D/A converter 322 and made available as an analog Y-C or RGB signal at the analog output port 326, as shown at steps 419 and 420. The control and selection circuitry 284 checks to see if a signal has been received from the image capture trigger circuitry 28a indicating that the operator has released the imaging trigger 28. If such a signal from the image capture trigger circuitry 28a has been received, then at 424, the control and selection circuitry 284 energizes the orange color of the LED indicator 32 for a predetermined time period to signal the operator that the image in the target area 44 has been successfully captured. Subsequently, the imaging assembly 18 is turned off.

If no signal is received from the image capture trigger circuitry 28a indicating that the operator has released the imaging trigger 28, then the process loops back to step 402 and successive image frames are captured, compressed and output to the serial output circuitry 296 until such time as the control and selection circuitry 284 received the signal from the image capture trigger circuitry 28a indicating that the imaging trigger 28 has been released.

As can best be seen in FIGS. 29A and 29B, the imaging assembly 18 includes the camera board assembly 38 of the modular camera assembly 20 which is electrically coupled to the control and decoder board 22. The control and decoder board 22 includes the microprocessor 266 and associated circuitry. The circuitry of the imaging assembly 18 may by embodied in software resident in one or more RAM or ROM memory chips 430 (FIG. 5) mounted on the control and decoder board 22 and operated by the microprocessor 266. Alternately, the circuitry of the imaging assembly 18 may comprise separate application-specific integrated circuitry (ASIC) mounted on the control and decoder board 22.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

I claim:

1. A portable data collection device comprising:
a) a black and white modular camera assembly including a photosensor array having a two dimensional array of photosensors overlaid by a color filter, the color filter including a plurality of color filter elements each overlying at least one photosensor, the plurality of color filter elements including a first set of filter elements having a first color and a second set of filter elements having a second color, a transmittivity of filter elements in the first set of filter elements being different than a transmittivity of the filter elements in photosensors being read out after an exposure period to generate an analog video signal representative of an image of a target area, the target area including a target dataform, the analog video signal including image signal portions wherein a magnitude of the signal represents respective charges accumulated on individual photo sensors of the array of photosensors during the exposure period;
b) a modular camera assembly housing for supporting components of the modular camera assembly;
c) an optic assembly including lens assembly supported within a shroud assembly and positioned to focus illumination reflected from the target area onto the array of photosensors, the optic assembly having a best focus position at a predetermined distance from an outwardly facing optic surface of an outermost lens which results in a clearest image of the target area being focused onto the array of photosensors;
d) an illumination assembly supported within the housing and directing illumination towards the target area and including a lens array having a plurality of optic surfaces for directing illumination generated by illumination sources toward an illumination area substantially congruent with the target area;
e) analog to digital conversion circuitry for converting the image signal portions of the analog video signal into a set of gray scale values, a magnitude of a given gray scale value proportional to an intensity of illumination incident on a given photosensor of the array of photosensors during the exposure period, the intensity of illumination incident on the given photosensor dependent upon a transmittivity of the color filter element overlying the given photosensor;
f) compensation circuitry for generating a set of adjusted gray scale value magnitudes by adjusting magnitudes of selected gray scale values of the set of gray scale values, the magnitudes of the selected gray scale values being adjusted to compensate for differences in intensity of illumination incident on a subset of photosensors of the photosensor array corresponding to the selected gray scale values during the exposure period, the differences in intensity of illumination being due to differences in transmittivity of different colored color filter elements overlying different photosensors of the subset of photosensors; and
g) image processing and decoding circuitry receiving as input the set of adjusted gray scale value magnitudes and decoding a portion of the imaged target area representing the target dataform.

2. The portable data collection device of claim 1 wherein the selected gray scale values correspond to a portions of the image of the target area representing the target dataform.

3. The portable data collection device of claim 1 wherein the device further includes conversion circuitry for converting the set of gray scale values into an analog color signal.

4. The portable data collection device of claim 3 wherein the analog signal is a Y-C color signal.

5. The portable data collection device of claim 3 wherein the analog signal is a RGB color signal.

6. The portable data collection device of claim 3 wherein the conversion circuitry converts the set of gray scale values to a selected one of an analog Y-C color signal and an analog RGB color signal.

7. The portable data collection device of claim 6 further including an operator accessible switch electrically coupled to the conversion circuitry to permit the operator to switch the conversion circuitry between converting the set of gray scale values to the Y-C signal and the RGB signal.

8. The portable data collection device of claim 1 wherein the color filter includes magenta colored color filter elements, green colored color filter elements, yellow colored color filter elements and cyan colored color filter elements.

9. The portable data collection device of claim 1 wherein the compensation circuitry includes circuitry that determines a color of color filter element associated with each selected gray scale value, calculates an average magnitude of the selected gray scale values for each color of color filter elements, and calculates an overall average magnitude for all selected gray scale values and then adjusts a magnitude of each of the selected gray scale values by multiplying the magnitude by a ratio of the overall average magnitude to the average magnitude of the color of color filter associated with the selected gray scale value.

10. The portable data collection device of claim 1 wherein the compensation circuitry includes circuitry that determines a set of average gray scale value magnitudes wherein each average gray scale value magnitude is corresponds to an average magnitude of a group of four gray scale values of the selected gray scale values, the group of four gray scale values corresponding to a contiguous two by two matrix of photosensors of the array of photosensors and then uses the selected gray scale values for each color of color filter elements, and calculates an overall average magnitude for all selected gray scale values and further adjusts a magnitude of each of the selected gray scale values by multiplying the magnitude by a ratio of the overall average magnitude to the average magnitude of the color of color filter associated with the selected gray scale value.

11. A portable data collection device comprising:
   a) a black and white modular camera assembly including a photosensor array having a two dimensional array of photosensors overlaid by a color filter, the color filter including a plurality of color filter elements each overlying at least one photosensor, the plurality of color filter elements including a first set of filter elements having a first color and a second set of filter elements having a second color, a transmittivity of filter elements in the first set of filter elements being different than a transmittivity of the filter elements in the second set of filter elements, the photosensors of the array of photosensors being read out after an exposure period to generate an analog video signal representative of an image of a target area, the target area including a target dataform;
   b) a modular camera assembly housing for supporting components of the modular camera assembly;
   c) an optic assembly including lens assembly supported within a shroud assembly and positioned to focus illumination reflected from the target area onto the array of photosensors, the optic assembly having a best focus position at a predetermined distance from an outwardly facing optic surface of an outermost lens which results in a clearest image of the target area being focused onto the array of photosensors;
   d) an illumination assembly supported within the housing and directing illumination towards the target area and including a lens array having a plurality of optic surfaces for directing illumination generated by illumination sources toward an illumination area substantially congruent with the target area;
   e) analog to digital conversion circuitry for converting the analog video signal into a set of gray scale values, a magnitude of a given gray scale value proportional to an intensity of illumination incident on a given photosensor of the array of photosensors during the exposure period, the intensity of illumination incident on the given photosensor dependent upon a transmittivity of the color filter element overlying the given photosensor;
   f) compensation circuitry for generating a set of adjusted gray scale value magnitudes by adjusting magnitudes of selected gray scale values of the set of gray scale values, the magnitudes of the selected gray scale values being adjusted to compensate for differences in intensity of illumination incident on a subset of photosensors of the photosensor array corresponding to the selected gray scale values during the exposure period, the differences in intensity of illumination being due to differences in transmittivity of different colored color filter elements overlying different photosensors of the subset of photosensors;
   g) image processing and decoding circuitry receiving as input the set of adjusted gray scale value magnitudes and decoding a portion of the imaged target area representing the target dataform; and
   h) wherein the color filter includes magenta colored color filter elements, green colored color filter elements, yellow colored color filter elements and cyan colored color filter elements.

12. The portable data collection device of claim 11 wherein the magenta colored color filter elements, green colored color filter elements, yellow colored color filter elements and cyan colored color filter elements of the color filter have found in a repeating pattern such that any two by two matrix of photosensors of the photosensor array includes a first photosensor overlaid by a magenta colored color filter element, a second photosensor overlaid by a green colored color filter element, a third photosensor overlaid by a yellow colored color filter element, and a fourth photosensor overlaid by a cyan colored color filter element.

13. The portable data collection device of claim 11 wherein the magenta colored color filter elements, green colored color filter elements, yellow colored color filter elements and cyan colored color filter elements of the color filter have found in a repeating pattern such that any two by two matrix of photosensors of the photosensor array includes a first photosensor overlaid by a magenta colored color filter element, a second photosensor overlaid by a green colored color filter element, a third photosensor overlaid by a yellow colored color filter element, and a fourth photosensor overlaid by a cyan colored color filter element.

14. A portable data collection device comprising:
   a) a black and white modular camera assembly including a photosensor array having a two dimensional array of photosensors overlaid by a color filter, the color filter including a plurality of color filter elements each overlying at least one photosensor, the plurality of color filter elements including a first set of filter elements having a first color and a second set of filter elements having a second color, a transmittivity of filter elements in the first set of filter elements being different than a transmittivity of the filter elements in the second set of filter elements, the photosensors of the array of photosensors being read out after an exposure period to generate an analog video signal representative of an image of a target area, the target area including a target dataform;
   b) a modular camera assembly housing for supporting components of the modular camera assembly;
   c) an optic assembly including lens assembly supported within a shroud assembly and positioned to focus illumination reflected from the target area onto the array of photosensors, the optic assembly having a best focus position at a predetermined distance from an outwardly facing optic surface of an outermost lens which results in a clearest image of the target area being focused onto the array of photosensors;
   d) an illumination assembly supported within the housing and directing illumination towards the target area and including a lens array having a plurality of optic surfaces for directing illumination generated by illumination sources toward an illumination area substantially congruent with the target area;

e) analog to digital conversion circuitry for converting the analog video signal into a set of gray scale values, a magnitude of a given gray scale value proportional to an intensity of illumination incident on a given photosensor of the array of photosensors during the exposure period, the intensity of illumination incident on the given photosensor dependent upon a transmittivity of the color filter element overlying the given photosensor;

f) compensation circuitry for generating a set of adjusted gray scale value magnitudes by adjusting magnitudes of selected gray scale values of the set of gray scale values, the magnitudes of the selected gray scale values being adjusted to compensate for differences in intensity of illumination incident on a subset of photosensors of the photosensor array corresponding to the selected gray scale values during the exposure period, the differences in intensity of illumination being due to differences in transmittivity of different colored color filter elements overlying different photosensors of the subset of photosensors;

g) image processing and decoding circuitry receiving as input the set of adjusted gray scale value magnitudes and decoding a portion of the imaged target area representing the target dataform; and h) wherein the compensation circuitry includes circuitry that determines a color of color filter element associated with each selected gray scale value, calculates an average magnitude of the selected gray scale values for each color of color filter elements, and calculates an overall average magnitude for all selected gray scale values and then adjusts a magnitude of each of the selected gray scale values by multiplying the magnitude by a ratio of the overall average magnitude to the average magnitude of the color of color filter associated with the selected gray scale value.

15. A portable data collection device comprising:

a) a black and white modular camera assembly including a photosensor array having a two dimensional array of photosensors overlaid by a color filter, the color filter including a plurality of color filter elements each overlying at least one photosensor, the plurality of color filter elements including a first set of filter elements having a first color and a second set of filter elements having a second color, a transmittivity of filter elements in the first set of filter elements being different than a transmittivity of the filter elements in the second set of filter elements, the photosensors of the array of photosensors being read out after an exposure period to generate an analog video signal representative of an image of a target area, the target area including a target dataform;

b) a modular camera assembly housing for supporting components of the modular camera assembly;

c) an optic assembly including lens assembly supported within a shroud assembly and positioned to focus illumination reflected from the target area onto the array of photosensors, the optic assembly having a best focus position at a predetermined distance from an outwardly facing optic surface of an outermost lens which results in a clearest image of the target area being focused onto the array of photosensors;

d) an illumination assembly supported within the housing and directing illumination towards the target area and including a lens array having a plurality of optic surfaces for directing illumination generated by illumination sources toward an illumination area substantially congruent with the target area;

e) analog to digital conversion circuitry for converting the analog video signal into a set of gray scale values, a magnitude of a given gray scale value proportional to an intensity of illumination incident on a given photosensor of the array of photosensors during the exposure period, the intensity of illumination incident on the given photosensor dependent upon a transmittivity of the color filter element overlying the given photosensor;

f) compensation circuitry for generating a set of adjusted gray scale value magnitudes by adjusting magnitudes of selected gray scale values of the set of gray scale values, the magnitudes of the selected gray scale values being adjusted to compensate for differences in intensity of illumination incident on a subset of photosensors of the photosensor array corresponding to the selected gray scale values during the exposure period, the differences in intensity of illumination being due to differences in transmittivity of different colored color filter elements overlying different photosensors of the subset of photosensors;

g) image processing and decoding circuitry receiving as input the set of adjusted gray scale value magnitudes and decoding a portion of the imaged target area representing the target dataform; and h) wherein the compensation circuitry includes circuitry that determines a set of average gray scale value magnitudes wherein each average gray scale value magnitude is corresponds to an average magnitude of a group of four gray scale values of the selected gray scale values, the group of four gray scale values corresponding to a contiguous two by two matrix of photosensors of the array of photosensors and then uses the selected gray scale values for each color of color filter elements, and calculates an overall average magnitude for all selected gray scale values and further adjusts a magnitude of each of the selected gray scale values by multiplying the magnitude by a ratio of the overall average magnitude to the average magnitude of the color of color filter associated with the selected gray scale value.

16. A portable data collection device comprising:

a) a black and white camera assembly including a photosensor array having a two dimensional array of photosensors overlaid by a color filter, the color filter including a plurality of color filter elements each overlying at least one photosensor, the plurality of color filter elements including a first set of filter elements having a first color and a second set of filter elements having a second color, a transmittivity of filter elements in the first set of filter elements being different than a transmittivity of the filter elements in the second set of filter elements, the photosensors of the array of photosensors being read out after an exposure period to generate an analog video signal representative of an image of a target area, the target area including a target dataform, the analog video signal including image signal portions wherein a magnitude of the signal represents respective charges accumulated on individual photosensors of the array of photosensors during the exposure period;

b) an optic assembly positioned to focus illumination reflected from the target area onto the array of photosensors c) analog to digital conversion circuitry for converting the analog video signal into a set of gray scale values, a magnitude of a given gray scale value proportional to an intensity of illumination incident on a given photosensor of the array of photosensors during the exposure period, the intensity of illumination incident on the given photosensor dependent upon a transmittivity of the color filter element overlying the given photosensor;

d) compensation circuitry for generating a set of adjusted gray scale value magnitudes by adjusting magnitudes of selected gray scale values of the set of gray scale values, the magnitudes of the selected gray scale values being adjusted to compensate for differences in intensity of illumination incident on a subset of photosensors of the photosensor array corresponding to the selected gray scale values during the exposure period, the differences in intensity of illumination being due to differences in transmittivity of different colored color filter elements overlying different photosensors of the subset of photosensors; and e) image processing and decoding circuitry receiving as input the set of adjusted gray scale value magnitudes and decoding a portion of the imaged target area representing the target dataform.

17. The portable data collection device of claim 16 wherein the selected gray scale values correspond to a portions of the image of the target area representing the target dataform.

18. The portable data collection device of claim 16 wherein the color filter includes magenta colored color filter elements, green colored color filter elements, yellow colored color filter elements and cyan colored color filter elements.

19. The portable data collection device of claim 18 wherein the magenta colored color filter elements, green colored color filter elements, yellow colored color filter elements and cyan colored color filter elements of the color filter have found in a repeating pattern such that any two by two matrix of photosensors of the photosensor array includes a first photosensor overlaid by a magenta colored color filter element, a second photosensor overlaid by a green colored color filter element, a third photosensor overlaid by a yellow colored color filter element, and a fourth photosensor overlaid by a cyan colored color filter element.

20. The portable data collection device of claim 16 wherein the compensation circuitry includes circuitry that determines a color of color filter element associated with each selected gray scale value, calculates an average magnitude of the selected gray scale values for each color of color filter elements, and calculates an overall average magnitude for all selected gray scale values and then adjusts a magnitude of each of the selected gray scale values by multiplying the magnitude by a ratio of the overall average magnitude to the average magnitude of the color of color filter associated with the selected gray scale value.

21. The portable data collection device of claim 16 wherein the compensation circuitry includes circuitry that determines a set of average gray scale value magnitudes wherein each average gray scale value magnitude is corresponds to an average magnitude of a group of four gray scale values of the selected gray scale values, the group of four gray scale values corresponding to a contiguous two by two matrix of photosensors of the array of photosensors and then uses the selected gray scale values for each color of color filter elements, and calculates an overall average magnitude for all selected gray scale values and further adjusts a magnitude of each of the selected gray scale values by multiplying the magnitude by a ratio of the overall average magnitude to the average magnitude of the color of color filter associated with the selected gray scale value.

* * * * *